United States Patent
Blevins et al.

(10) Patent No.: US 10,140,253 B2
(45) Date of Patent: *Nov. 27, 2018

(54) INFERENTIAL PROCESS MODELING, QUALITY PREDICTION AND FAULT DETECTION USING MULTI-STAGE DATA SEGREGATION

(71) Applicant: FISHER-ROSEMOUNT SYSTEMS, INC., Round Rock, TX (US)

(72) Inventors: Terrence L. Blevins, Round Rock, TX (US); Wilhelm K. Wojsznis, Austin, TX (US); Mark J. Nixon, Round Rock, TX (US); John M. Caldwell, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 385 days.

This patent is subject to a terminal disclaimer.

(21) Appl. No.: 14/806,252

(22) Filed: Jul. 22, 2015

(65) Prior Publication Data

US 2015/0324329 A1 Nov. 12, 2015

Related U.S. Application Data

(62) Division of application No. 13/611,733, filed on Sep. 12, 2012, now Pat. No. 9,110,452.

(Continued)

(51) Int. Cl.
*G06F 19/00* (2018.01)
*G06F 17/18* (2006.01)
(Continued)

(52) U.S. Cl.
CPC ............. *G06F 17/18* (2013.01); *G05B 17/02* (2013.01); *G05B 23/024* (2013.01); *G06F 17/16* (2013.01)

(58) Field of Classification Search
CPC ....... G05B 23/024; G05B 17/02; G06F 17/18; G06F 17/16
See application file for complete search history.

(56) References Cited

U.S. PATENT DOCUMENTS

| 9,110,452 B2 | 8/2015 | Blevins et al. |
| 2003/0036868 A1 | 2/2003 | Yutkowitz |

(Continued)

FOREIGN PATENT DOCUMENTS

| GB | 2 482 367 A | 2/2012 |
| JP | S57-13511 A | 1/1982 |

(Continued)

OTHER PUBLICATIONS

Notice of Reasons for Rejection for Japanese Application No. 2016-217779, dated Oct. 3, 2017.

(Continued)

*Primary Examiner* — Michael D Masinick
(74) *Attorney, Agent, or Firm* — Marshall, Gerstein & Borun LLP

(57) ABSTRACT

A process modeling technique uses a single statistical model, such as a PLS, PRC, MLR, etc. model, developed from historical data for a typical process and uses this model to perform quality prediction or fault detection for various different process states of a process. The modeling technique determines means (and possibly standard deviations) of process parameters for each of a set of product grades, throughputs, etc., compares on-line process parameter measurements to these means and uses these comparisons in a single process model to perform quality prediction or fault detection across the various states of the process. Because only the means and standard deviations of the process parameters of the process model are updated, a single process model can be used to perform quality prediction or fault detection while the process is operating in any of the (Continued)

defined process stages or states. Moreover, the sensitivity (robustness) of the process model may be manually or automatically adjusted for each process parameter to tune or adapt the model over time.

21 Claims, 18 Drawing Sheets

Related U.S. Application Data

(60) Provisional application No. 61/536,423, filed on Sep. 19, 2011.

(51) Int. Cl.
    *G06F 17/16*     (2006.01)
    *G05B 17/02*     (2006.01)
    *G05B 23/02*     (2006.01)

(56) References Cited

U.S. PATENT DOCUMENTS

| | | |
|---|---|---|
| 2005/0091005 A1* | 4/2005 | Huard .............. G06F 11/3419 702/186 |
| 2006/0195375 A1 | 8/2006 | Bohn |
| 2007/0047586 A1 | 3/2007 | Tieman et al. |
| 2007/0225836 A1 | 9/2007 | Swanson |
| 2008/0027678 A1 | 1/2008 | Miller |
| 2008/0082302 A1 | 4/2008 | Samardzija et al. |
| 2008/0276128 A1 | 11/2008 | Lin et al. |
| 2009/0024429 A1 | 1/2009 | Jones et al. |
| 2009/0089009 A1 | 4/2009 | Miller |
| 2010/0017008 A1 | 1/2010 | Yelchuru et al. |
| 2012/0035755 A1 | 2/2012 | Byrne et al. |
| 2013/0069792 A1 | 3/2013 | Blevins et al. |
| 2013/0185055 A1 | 7/2013 | Theoret et al. |
| 2013/0326620 A1 | 12/2013 | Merza et al. |

FOREIGN PATENT DOCUMENTS

| | | |
|---|---|---|
| JP | 2002108412 A | 4/2002 |
| JP | 2004-038357 A | 2/2004 |
| JP | 2004078812 A | 3/2004 |
| JP | 2006107256 A | 4/2006 |
| JP | 2007-250748 A | 9/2007 |
| JP | 2010-156152 A | 7/2010 |
| WO | WO-2006/102322 A2 | 9/2006 |

OTHER PUBLICATIONS

Dunia et al., "Multistate PCA for Continuous Processes," American Control Conference (ACC), pp. 6673-6678 (2012).

Dunia et al., "Multistate PLS for Continuous Processes," American Control Conference (ACC), pp. 2794-2799 (2012).

Koller, Daphne, and Raya Fratkina. "Using Learning for Approximation in Stochastic Processes." ICML. 1998.

Neal, Radford M. "Slice sampling." Annals of statistics (2003): 705-741.

Nomikos, Paul, and John F. MacGregor. "Monitoring batch processes using multiway principal component analysis." AIChE Journal 40.8 (1994): 1361-1375.

Search Report for Application No. GB1216480.2, dated Jan. 14, 2013.

Zhao, Chunhui, et al. "Stage-based soft-transition multiple PCA modeling and on-line monitoring strategy for batch processes." Journal of Process Control 17.9 (2007): 728-741.

Office Action, Japanese Patent Application No. 2015-186868, dated Aug. 9, 2016.

Examination Report, British Patent Application No. 1216480.2, dated Jan. 17, 2018.

Combined Search and Examination Report for Application No. GB1804305.9, dated Jul. 30, 2018.

\* cited by examiner

Process Analytics Online - Continuous List - Internet Explorer

\\VCode\win32\debug\BatchAnalytics\BatchAnalyticsOnlineULab

Process Analytics Online - ... ×

Process Analytics Online

| Batch List | Continuous List | Quality Prediction | Fault Detection | Alarm History |

| Module | Block | Q | F | Area | Last Alarm |
|---|---|---|---|---|---|
| MIXER_CDA | CDA1 | Good | | Area 0 | 7/29/2011 7:43:50 AM |
| MIXER_CDA2 | CDA1 | Good | | Area 0 | 7/29/2011 7:43:51 AM |

FIG. 11A

INFERENTIAL PROCESS MODELING, QUALITY PREDICTION AND FAULT DETECTION USING MULTI-STAGE DATA SEGREGATION

RELATED APPLICATIONS

This application is a divisional of U.S. patent application Ser. No. 13/611,733, entitled "Inferential Process Modeling, Quality Prediction and Fault Detection Using Multi-Stage Data Segregation," filed Sep. 12, 2012; which claims the benefit under 35 U.S.C. § 119(e) of U.S. Provisional Application Ser. No. 61/536,423, entitled "Inferential Process Modeling, Quality Prediction and Fault Detection Using Multi-Stage Data Segregation," filed Aug. 19, 2011, the entire disclosures of each of which are hereby expressly incorporated by reference herein.

FIELD OF THE DISCLOSURE

This patent generally relates to process control system modeling and, more particularly, to methods of performing process modeling, quality prediction and fault detection in a continuous or a batch process using multi-stage or multi-state data segregation.

BACKGROUND

Process control systems, like those used in chemical, petroleum or other processes, typically include one or more process controllers and input/output (I/O) devices communicatively coupled to at least one host or operator workstation and to one or more field devices via analog, digital or combined analog/digital buses. The field devices, which may be, for example, valves, valve positioners, switches and transmitters (e.g., temperature, pressure and flow rate sensors), perform process control functions within the process such as opening or closing valves and measuring process control parameters. The process controllers receive signals indicative of process measurements made by the field devices, process this information to implement a control routine, and generate control signals that are sent over the buses or other communication lines to the field devices to control the operation of the process. In this manner, the process controllers may execute and coordinate control strategies using the field devices via the buses and/or other communication links.

Process information from the field devices and the controllers may be made available to one or more applications (i.e., software routines, programs, etc.) executed by the operator workstation (e.g., a processor-based system) to enable an operator to perform desired functions with respect to the process, such as viewing the current state of the process (e.g., via a graphical user interface), evaluating the process, modifying the operation of the process (e.g., via a visual object diagram), etc. Many process control systems also include one or more application stations (e.g., workstations) that are typically implemented using a personal computer, laptop, or the like and that are communicatively coupled to the controllers, operator workstations, and other systems within the process control system via a local area network (LAN). Each application station may include a graphical user interface that displays the process control information including values of process variables, values of quality parameters associated with the process, process fault detection information, and/or process status information.

Typically, displaying process information in the graphical user interface is limited to the display of a value of each process variable associated with the process. In some cases, process control systems may characterize simple relationships between some process variables to estimate quality metrics associated with the process. However, in most cases where a resultant product of the process does not conform to predefined quality control metrics, the process and/other process variables can generally only be analyzed in detail after the completion of the product.

The use of predictive modeling for process quality prediction and fault detection is beginning to be prevalent in both continuous processes and batch processes. As is known, continuous processes operate in a continuous manner on a set of continuously supplied raw materials to produce an output product. Generally speaking, the process controller(s) used in continuous processes attempt to keep various process parameters the same at particular locations within the process. However, because continuous processes regularly experience variations in, for example, throughput, the types or grades of product being made, the makeup of the raw materials input to the process, etc., it is difficult to perform quality predictions of the output of the process on-line (i.e., while the process is operating) because the process parameter values may change at any particular location based on a change in the throughput, the grade of the product being made, etc. Batch processes, on the other hand, typically operate to process a common set of raw materials together as a "batch" through various numbers of stages or steps, to produce a product. Multiple stages or steps of a batch process may be performed using the same equipment, such as a tank, while others of the stages or steps may be performed in other equipment. However, because the temperature, pressure, consistency, pH, or other parameters of the materials being processed changes over time during the operation of the batch, many times while the material remains in the same location, it is difficult to determine whether the batch process is operating at any particular time during the batch run in a manner that is likely to produce an end product with the desired quality metrics. Thus, it is also difficult to perform quality prediction and fault detection within batch processes.

One known method of predicting whether a currently operating process is progressing normally or within desired specifications (and is thus likely to result in a final product having desired quality metrics) involves comparing various process variable measurements made during the operation of the on-going process with similar measurements taken during the operation of previously run process, the outcome of which has been measured or is otherwise known. However, as noted above, runs of continuous processes vary based on throughput and product grade and runs of batch processes typically vary in temporal length, i.e., vary in the time that it takes to complete the batch, making it difficult to know which time within the previous process run is most applicable to the currently measured parameters of the on-line process. Moreover, in many cases, process variables can vary widely during the operation of the process, as compared to those of a selected previous process, without a significant degradation in quality of the final product. As a result, it is often difficult, if not practically impossible, to identify a particular previous run of the process that is capable of being used in all cases to measure or to predict the quality of subsequent process runs.

A more advanced method of analyzing the results of on-going continuous and batch processes that overcomes one of the problems identified above involves creating a statistical model for the process based on various runs of the process. This technique involves collecting data for each of a set of process variables (parameters) from a number of different runs of a process or for a number of different times in a process and identifying or measuring quality metrics for each of those sets of data. Thereafter, the collected parameters and quality data are used to create a statistical model of the process, with the statistical model representing the "normal" operation of the process that results in desired quality metrics. This statistical model of the process can then be used to analyze how different process parameter measurements made during a particular process implementation statistically relate to the same measurements made within the processes used to develop the model. For example, this statistical model may be used to provide an average or a median value of each measured process parameter, and a standard deviation associated with each measured process variable at any particular time or location during the process run to which the currently measured process variables can be compared. Moreover, this statistical model may be used to predict how the current state of the process will affect or relate to the ultimate quality of the product produced at the end of or at the output of the process.

Generally, both linear and non-linear statistically based process predictors can be used to predict product quality parameters that are not available for on-line measurements. Such process parameter predictors are known by various different names including, for example, soft sensors, inferential sensors and the like. There are, in fact, several types of model based linear predictors that are used to perform process parameter prediction within processes, with the most prevalent of these model based predictors being multiple linear regression (MLR) predictors, principal component regression (PCR) predictors, principal component analysis (PCA) predictors, partial least squares (PLS) predictors and discriminate analysis (DA) predictors. Such predictors can be used in both off-line and on-line analysis tools to predict a process parameter, such as a quality measure of a product being produced by a process. Additionally, it is known to use principle component analysis (PCA) techniques to perform fault detection within processes.

However, known model based predictors have a significant deficiency in that they are generally unable to adjust the predictive process models used therein to the changing process states that may result from, for example, a change in the production rate or throughput of the process, a change in product grades, etc. In fact, to deal with this issue using prior art techniques, it is necessary to construct a separate model for every possible production rate or product grade. However, this technique leads to a predictor that is very complex to build and use, because developing, storing and using the numerous predictive models becomes very processor intensive, requires a lot of memory space and is complex to implement and maintain in real-time systems.

Thus, while it is known to use statistical process modeling techniques to model processes, such as continuous processes, these modeling techniques typically only work well when a continuous process is stable or well-defined, i.e., when there is little variation in the product being made or in the throughput of the process. As a result, the on-line implementation of analytic tools such as PCA and PLS techniques for fault detection and prediction has, in many instances, been limited to continuous processes in which a single product is produced. In such instances, the process is often treated as a single unit with a fixed set of measurements and lab analyses. For these types of processes, a single PCA or PLS model may be developed and applied in an on-line environment. Unfortunately, these techniques do not address the requirements of continuous or batch processes in which multiple grades of products may be produced using one or more different pieces of plant equipment (at different times) or having variable throughputs, or in which other operating conditions are changed regularly.

SUMMARY

A process modeling technique uses a single statistical model, such as a PLS, PRC, MLR, etc. model, developed from historical data for a typical process and adapts this model for use in quality prediction or fault detection for various different process states. More particularly, the modeling technique determines means (and possibly standard deviations) of process parameters for each of a set of product grades, throughputs, etc., compares on-line process parameter measurements to these means and uses these comparisons in a single process model to perform quality prediction or fault detection across the various states of the process. Because only the means and standard deviations of the process parameters of the process model are updated, a single process model can be used to perform quality prediction or fault detection while the process is operating in any of the defined process stages or states. Moreover, the sensitivity (robustness) of the process model may be manually or automatically adjusted for each process parameter to tune or adapt the model over time.

A process quality prediction and fault detection system using this modeling technique has significantly increased functionally and usefulness in both continuous and batch processes, as the quality prediction and fault detection system allows the status of an inferential sensor to be adjusted, and offers additional insight into the current on-line operation of a process for operating personnel.

The disclosed modeling technique, which may be used in batch or continuous manufacturing processes, divides the operation of the process into the different stages or states associated with or defined by a state parameter that, typically speaking, is related to or are indicative of the various possible states of the process. The state parameter may be, for example, a product grade, a throughput of the process, or any other significant disturbance variable of the process.

The modeling technique first develops a quality prediction or fault detection model based on measured operation of the process across multiple process stages, and thereafter uses this model to perform quality prediction or fault detection during on-line operation of the process. During the model creation stage, the method collects training data generated from the process, the training data including values or measurements of the various process parameters to be used as inputs to the model being created, values of a state parameter defining the process states, and values of a quality parameter or fault indication. The method may, for a quality prediction model, time shift the process input parameter values and state parameter value to align this data with the quality parameter to be predicted, to thereby eliminate the effects of variable process delay between process inputs and the quality parameter being predicted. The time shifted data (in the case of generating a quality prediction model) or the training data (in the case of a fault detection model) is then processed to determine a set of process parameter means, a state parameter mean and a quality or fault parameter mean for each process state. These process state means and the state parameter value of each time slice of data (in the time aligned data or the training data) are then used to develop a set of time slice means for each time slice of data, and the instantaneous values of the process parameters and the time slice means are then used to develop a set of deviation from the means for each time slice. The sets of deviations from the means may then be filtered, and the filtered values of the deviations from the means are used to develop the process model, such as a PLS model, a neural network (NN) model, a MLR model, a PCA model, etc. The process state means are also stored as part of the model.

Thereafter, during the on-line operation of the process, the model may be used to perform quality prediction or fault detection. In particular, process parameter and state parameter measurements are obtained from the process as the process operates on-line, and this data may be stored in temporary memory. For a quality prediction model, the process and state parameter measurements may be time shifted in the same manner as performed during development of the model. In any event, sets of time slice data are obtained from the process, each time slice of data including a value of each of the process input parameters and the state parameter. The process parameter means and the state parameter means stored as part of the model are then used, along with the value of the state parameter of each time slice to determine time slice means for the process parameters of each time slice. The time slice means of each time slice of data and the values of the process parameters and the state parameter of the time slice are then used to create a set of deviations from the means for the time slice of data. The deviations from the means for each time slice may be filtered and the output of the filter are then input to the process model to perform quality prediction or fault detection on-line within the process.

Significantly, the model so created and operated will be able to make quality predictions or fault detection across all of the defined process states without needing to change the process model, or develop a different process model for each process state. In fact, the varying operation of the process in the different process states is accounted for in the operation of changing the time slice means used to determine deviations from the means input to the model. Moreover, filtering of the deviation from the means provides for better quality prediction or fault detection when the process is transitioning between different process states.

Thus, model generation and data analytics techniques using process state definitions previously determined for a process develop different sets of deviations from the mean for various different operating states of the process and then use these different sets of deviations from the mean in a single process model, without needing to generate a new or different process model for each operating region or state of the process. Put another way, a process model used to perform on-line data analytics for a process can be determined once for the process and be used to analyze the process even when the process operates in different operating states, without needing to determine a separate model for each stage or state of operation of the process. Instead, the inputs to the model are based on deviations from means which are varied or are changed for the different process stages or states, so as to provide the model with the ability to make quality predictions or to perform fault detection based on the process state in which the process is currently operating without changing the model itself.

If desired, the process state means may be adapted during on-line operation of the process by collecting additional data from the process pertaining to one or more process states, such as process states for which no or little data was collected during the model creation phase, or for process states in which the process operation may have changed since model creation. After collecting new data, the process means for the new or changed process state may be determined and stored as part of the process model, to thereby allow the process model to be used to perform quality prediction or fault detection in the new process state or the changed process state without regenerating the process model itself.

Still further alarms and alerts may be automatically generated based on the operation of the on-line quality predication and fault detection system, and these alarms or alerts may be provided to a user during operation of the process to enable the user to make desired changes or to take corrective action. Still further advanced user interface functionality allows a user to easily view process variable trend plots at or near the time a particular alarm or alert was generated to determine which process parameter(s) may have been responsible for the alarm or alert. These trend plots may enable a user to view the historical values of the process parameters compared with the mean and standard deviations of the process parameter at or near the time of the alert without needing to manually search through a data historian for this information. Such functionality makes trouble shooting and taking corrective actions easier and faster during on-line operation of the process.

BRIEF DESCRIPTION OF THE DRAWINGS

FIGS. 11A-11D illustrate a series of user interface screens that may be created and provided to a user to allow a user to easily view process parameter trend plots related to an alarm or an alert generated using a quality prediction or fault detection or other alarming system.

DETAILED DESCRIPTION

Figure 1:
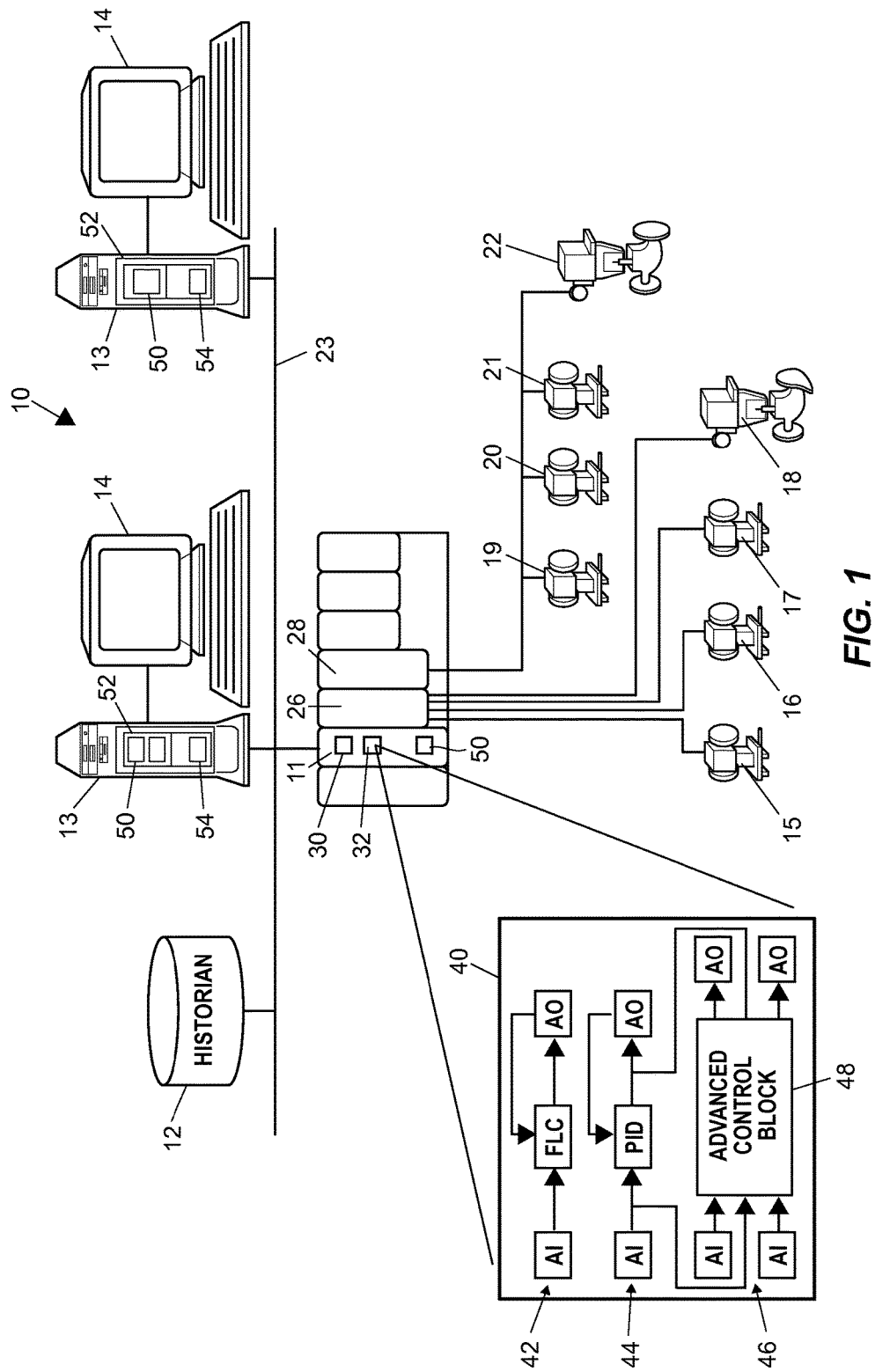
FIG. 1 is a diagram of a process control network having a controller and field devices that may be used to implement a process and various process modeling components to provide process quality prediction and fault detection.

FIG. 1 illustrates an example process control system 10 in which an enhanced technique of performing on-line quality prediction and fault detection may be implemented. In particular, the quality prediction and fault detection techniques to be implemented in the system 10 generate a set of quality prediction and/or fault detection models from process data and then enables a user to use these models to perform on-line quality prediction and fault detection across multiple predefined process states or process stages, in either a continuous process or a batch process. As a result, these techniques are applicable to or usable to perform quality prediction and/or fault detection in continuous or batch process in which throughput, product grade or some other disturbance variable is changed regularly, without the need to generate separate models for each possible process stage or process state.

The process control system illustrated in FIG. 1 includes a process controller 11 connected to a data historian 12 and to one or more host workstations or computers 13 (which may be any type of personal computers, workstations, etc.), each having a display screen 14. The controller 11 is also connected to field devices 15-22 via input/output (I/O) cards 26 and 28 and may operate to implement one or more batch runs of a batch process using the field devices 15-22. The data historian 12 may be any desired type of data collection unit having any desired type of memory and any desired or known software, hardware or firmware for storing data. The data historian 12 may be separate from (as illustrated in FIG. 1) or a part of one of the workstations 13. The controller 11, which may be, by way of example, the DeltaV™ controller sold by Emerson Process Management, is communicatively connected to the host computers 13 and to the data historian 12 via, for example, an Ethernet connection or any other desired communication network 23. The controller 11 is also communicatively connected to the field devices 15-22 using any desired hardware and software associated with, for example, standard 4-20 ma devices and/or any smart communication protocol such as the FOUNDATION® Fieldbus protocol, the HART® protocol, the WirelessHART™ protocol, etc.

The field devices 15-22 may be any types of devices, such as sensors, valves, transmitters, positioners, etc., while the I/O cards 26 and 28 may be any types of I/O devices conforming to any desired communication or controller protocol. In the embodiment illustrated in FIG. 1, the field devices 15-18 are standard 4-20 ma devices or HART devices that communicate over analog lines or combined analog and digital lines to the I/O card 26, while the field devices 19-22 are smart devices, such as FOUNDATION® Fieldbus field devices, that communicate over a digital bus to the I/O card 28 using a Fieldbus communications protocol. Of course, the field devices 15-22 could conform to any other desired standard(s) or protocols, such as any wired or wireless protocols, including any standards or protocols developed in the future.

The controller 11 includes a processor 30 that implements or oversees one or more process control routines (stored in a memory 32), which may include control loops, and communicates with the devices 15-22, the host computers 13 and the data historian 12 to control a process in any desired manner. It should be noted that any control routines or modules (including quality prediction and fault detection modules or function blocks) described herein may have parts thereof implemented or executed by different controllers or other devices if so desired. Likewise, the control routines or modules described herein which are to be implemented within the process control system 10 may take any form, including software, firmware, hardware, etc. Control routines may be implemented in any desired software format, such as using object oriented programming, ladder logic, sequential function charts, function block diagrams, or using any other software programming language or design paradigm. The control routines may be stored in any desired type of memory, such as random access memory (RAM), or read only memory (ROM). Likewise, the control routines may be hard-coded into, for example, one or more EPROMs, EEPROMs, application specific integrated circuits (ASICs), or any other hardware or firmware elements. Thus, the controller 11 may be configured to implement a control strategy or control routine in any desired manner.

In some embodiments, the controller 11 implements a control strategy using what are commonly referred to as function blocks, wherein each function block is an object or other part (e.g., a subroutine) of an overall control routine and operates in conjunction with other function blocks (via communications called links) to implement process control loops within the process control system 10. Control based function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 10. Of course, hybrid and other types of function blocks exist. Function blocks may be stored in and executed by the controller 11, which is typically the case when these function blocks are used for, or are associated with standard 4-20 ma devices and some types of smart field devices such as HART devices, or may be stored in and implemented by the field devices themselves, which can be the case with Fieldbus devices.

As illustrated by the exploded block 40 of FIG. 1, the controller 11 may include a number of single-loop control routines, illustrated as routines 42 and 44, and, if desired, may implement one or more advanced control loops, such as multiple/input-multiple/output control routines, illustrated as control loop 46. Each such loop is typically referred to as a control module. The single-loop control routines 42 and 44 are illustrated as performing single loop control using a single-input/single-output fuzzy logic control block and a single-input/single-output PID control block, respectively, connected to appropriate analog input (AI) and analog output (AO) function blocks, which may be associated with process control devices such as valves, with measurement devices such as temperature and pressure transmitters, or with any other device within the process control system 10.

An advanced control loop 46 is illustrated as including inputs communicatively connected to one or more AI function blocks and outputs communicatively connected to one or more AO function blocks, although the inputs and outputs of an advanced control block 48 may be connected to any other desired function blocks or control elements to receive other types of inputs and to provide other types of control outputs. The advanced control block 48 may be any type of model predictive control (MPC) block, neural network modeling or control block, a multi-variable fuzzy logic control block, a real-time-optimizer block, etc. or may be an adaptively tuned control block, etc. It will be understood that the function blocks illustrated in FIG. 1 can be executed by the controller 11 or, alternatively, can be located in and executed by any other processing device, such as one of the workstations 13 or even one of the field devices 19-22.

Moreover, as illustrated in FIG. 1, one or more process analysis routines or function blocks 50 may be stored and executed by various devices of the process control system 10, and these process analysis routines 50 may be used to implement the quality prediction and fault detection data analytics described in more detail below. While process analysis routines 50 are illustrated as being stored in one or more computer readable memories 52 to be executed on processors 54 of the workstations 13 and the controller 11, the routines or function blocks 50 can also be stored in and executed in other devices instead, such as in field devices 15-22, in the data historian 12 or in stand-alone devices. The process analysis routines 50 are communicatively coupled to one or more control routines such as the control routines 42, 44, 46, and/or to the data historian 12 to receive one or more measured process variable measurements and, in some cases, user inputs related to performing data analytics. Generally speaking, the process analysis routines 50 are used to develop one or more statistical process models and to analyze on-going or on-line process operation based on those models, as will be described in more detail herein. The analysis routines 50 may also display information to users, such as batch or continuous process operators, regarding the on-line or on-going operation of the process, as being implemented by the process control system 10. The routines 50 may also obtain needed information from users to be used in the data analytics.

Figure 2:
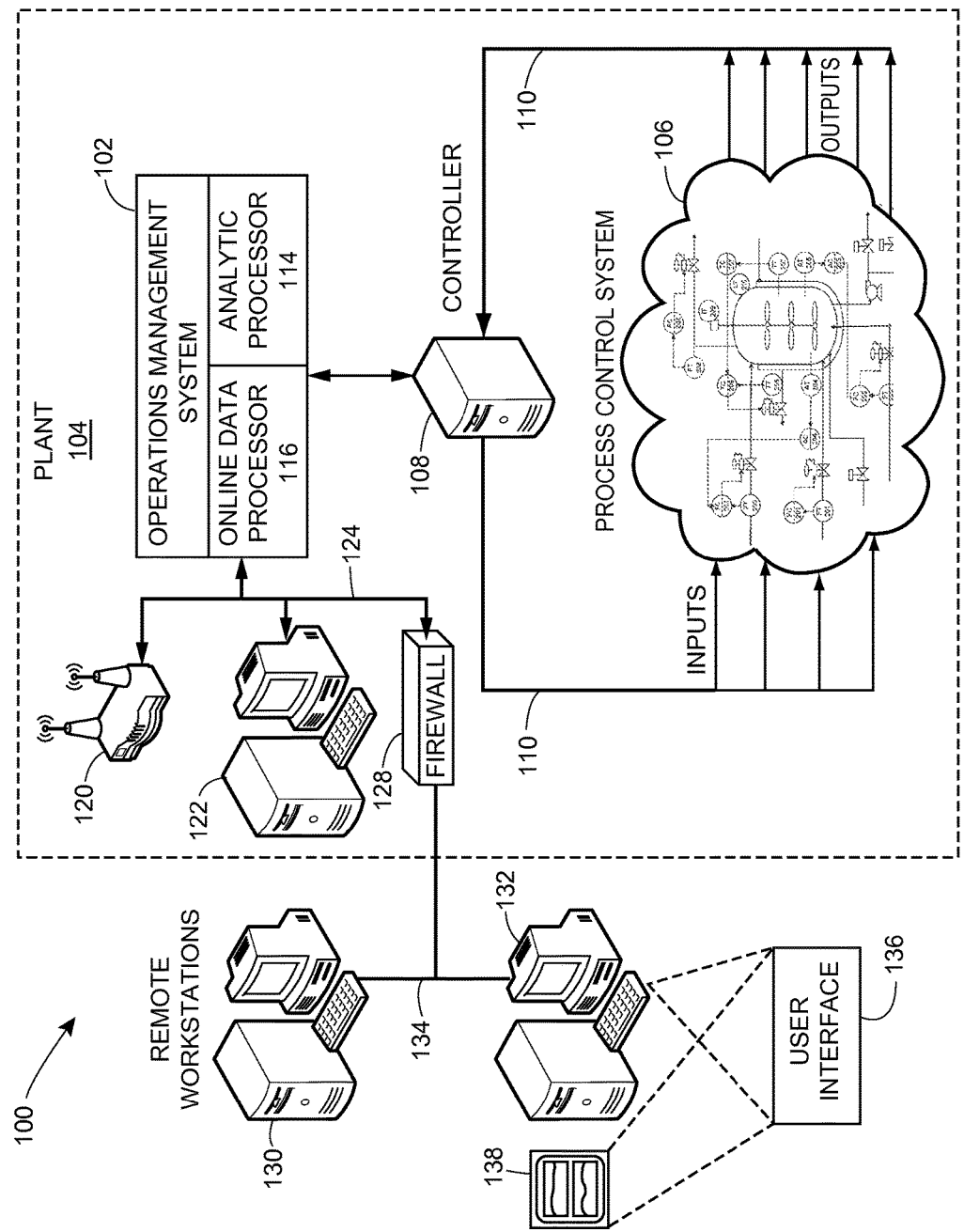
FIG. 2 is a block diagram illustrating an example process control system including an example operations management system that may implement an on-line process analysis system for analyzing processes.

FIG. 2 is a block diagram illustrating a further example of a process control environment 100 including an operations management system (OMS) 102, also referred to as a Process Monitoring and Quality Prediction System (PMS), which can be used to implement an on-line process modeling and analysis system described in more detail herein. The OMS 102 is located within a plant 104 that includes a process control system 106, which may include portions of or all of, for example, the process control network 10 of FIG. 1. The example plant 104 may be any type of manufacturing facility, process facility, automation facility, and/or any other type of process control structure or system. In some examples, the plant 104 may include multiple facilities located at different locations. Thus, although the plant 104 of FIG. 2 is illustrated as including a single process control system 106, the plant 104 may include additional process control systems.

The process control system 106, which is communicatively coupled to a controller 108 via a data bus 110, may include any number of field devices (e.g., input and/or output devices) for implementing process functions such as performing physical functions within the process or taking measurements of process parameters (process variables). The field devices may include any type of process control component that is capable of receiving inputs, generating outputs, and/or controlling a process. For example, the field devices may include input devices such as, for example, valves, pumps, fans, heaters, coolers, and/or mixers to control a process. Additionally, the field devices may include output devices such as, for example, thermometers, pressure gauges, concentration gauges, fluid level meters, flow meters, and/or vapor sensors to measure process variables within or portions of a process. The input devices may receive instructions from the controller 108 to execute one or more specified commands and cause a change to the process. Furthermore, the output devices measure process data, environmental data, and/or input device data and transmit the measured data to the controller 108 as process control information. This process control information may include the values of variables (e.g., measured process variables and/or measured quality variables) corresponding to a measured output from each field device.

In the illustrated example of FIG. 2, the controller 108 may communicate with the field devices within the process control system 106 via the data bus 110, which may be coupled to intermediate communication components within the process control system 106. These communication components may include field junction boxes to communicatively couple field devices in a command area to the data bus 110. Additionally, the communication components may include marshalling cabinets to organize the communication paths to the field devices and/or field junction boxes. Furthermore, the communication components may include I/O cards to receive data from the field devices and convert the data into a communication medium capable of being received by the example controller 108. These I/O cards may convert data from the controller 108 into a data format capable of being processed by the corresponding field devices. In one example, the data bus 110 may be implemented using the Fieldbus protocol or other types of wired and/or wireless communication protocols (e.g., Profibus protocol, HART protocol, etc.).

The controller 108 of FIG. 2 (which may be a personal computer or any other type of controller device) executes one or more control routines to manage the field devices within the process control system 106. The control routines may include process monitoring applications, alarm management applications, process trending and/or history applications, batch processing and/or campaign management applications, statistical applications, streaming video applications, control applications, advanced control applications, etc. Furthermore, the controller 108 may forward process control information to the OMS 102 and to a data historian (not shown in FIG. 2). The control routines may be implemented to ensure that the process control system 106 produces specified quantities of a desired product within a certain quality threshold. For example, the process control system 106 may be configured as a batch system that produces a product at a conclusion of a batch. In other examples, the process control system 106 may include a continuous process manufacturing system.

The process control information from the controller 108 may include values corresponding to measured process and/or quality parameters that originate in the field devices within the process control system 106. In other examples, the OMS 102 may parse values within the process control information into the corresponding variables. The measured process parameters may be associated with process control information originating from field devices that measure portions of the process and/or characteristics of the field devices. The measured quality parameters may be associated with process control information related to measuring characteristics of the process that are associated with at least a portion of a completed product.

For example, the process may perform a chemical reaction in a tank that produces a concentration of a chemical in a fluid. In this example, the concentration of the chemical in the fluid may be a quality parameter. A temperature of the fluid and a rate of fluid flow into the tank may be process parameters. A throughput of the process may be a process parameter defined by a user to be a state parameter. The OMS 102, via process control modeling and/or monitoring as discussed in more detail below, may determine that the concentration of the fluid in the tank depends on the temperature of the fluid in the tank and the fluid flow rate into the tank. In other words, the measured process parameters contribute to or affect the quality of the measured quality parameter. The OMS 102 may use statistical processing to perform fault detection and/or quality prediction and to, for example, determine the amount of influence and/or contribution each process parameter has on a quality parameter.

Additionally, the OMS 102 may model and/or determine relationships between the measured process parameters and/or quality parameters associated with the process control system 106. These relationships between the measured process and/or quality parameters make it possible to create one or more calculated quality parameters. A calculated quality parameter may be a multivariate and/or linear algebraic combination of one or more measured process parameters, measured quality parameters, and/or other calculated quality parameters. Furthermore, the OMS 102 may determine an overall quality parameter from a combination of the measured process parameters, measured quality parameters, and/or calculated quality parameters. The overall quality parameter may correspond to a quality determination of the entire process and/or may correspond to a predicted quality of a resulting product of the process. Of course quality parameters may be measured on-line or off-line (e.g. using lab analyses).

As illustrated in FIG. 2, the OMS 102 includes an analytic processor 114 that utilizes descriptive modeling, predictive modeling, and/or optimization to generate feedback regarding the status and/or quality of the process control system 106. The analytic processor 114 may execute routines (such as the routines 50 of FIG. 1) to detect, identify, and/or diagnose process operation faults and predict the impact of any faults on quality parameters and/or an overall quality parameter associated with a quality of a resultant product of the process control system 106. Furthermore, the analytic processor 114 may monitor the quality of the process operation by statistically and/or logically combining quality and/or process parameters into an overall quality parameter associated with the overall quality of the process. The analytic processor 114 may then compare the values calculated for the overall quality parameter and/or values associated with the other quality parameters to respective thresholds. These thresholds may be based on the predetermined quality limits of the overall quality parameter at different times within the process. For example, if an overall quality parameter associated with a process exceeds a threshold for an amount of time, the predicted final quality of the resulting product may not meet quality metrics associated with the finished product.

If the overall quality parameter and/or any other quality parameters deviate from the respective thresholds, the analytic processor 114 may generate a fault indication within a process overview chart and/or a process variation graph that shows an explained and/or an unexplained variation (or variance) associated with the overall quality parameter and/or may show a variable or parameter that generated the process fault. The example analytic processor 114 manages the analysis to determine a cause of one or more process faults by providing functionality that enables an operator to generate process quality graphs (e.g., combination graphs, microcharts, process variation graphs, variable trend graphs, graphics, etc.) that may display current and/or past values of measured process parameters, measured quality parameters, and/or calculated quality parameters, etc. Furthermore, in some cases, the analytic processor 114 generates these graphs while the process is operating and continually updates and/or re-calculates multivariate statistics associated with each of the graphs as additional process control information is received by the OMS 102.

To perform these functions for continuous and batch processes, the OMS 102 collects process data for a number of different process parameters for each of a number of different times in a continuous process or for each of a number of different batch runs in a batch process. This data may be collected from the controller 108 or the field devices within the control network 110, from a data historian (e.g., the data historian 12 of FIG. 1) that may have already collected and stored process data for different batch runs of the process, or from any other data source. The OMS 102 then processes this data to generate one or more statistical models, and stores the statistical models in, for example, a memory, such as a computer readable memory of the OMS 102 or in one of the memories 52 of the workstations 13 of FIG. 1. The statistical models can then be retrieved as needed to analyze ongoing or on-line process runs in the future. In particular, the OMS 102 may use the stored models to analyze or to enable a user to analyze data collected during the on-line or on-going operation of a particular process run.

However, to analyze the data from a process run while the process is operating on-line, the OMS 102 determines the stage or state at which the on-line process is operating with respect to the model. That is, in this case, the OMS 102 determines what inputs the model is to use to determine other factors about the on-line process, such as whether any of the parameters of the on-line process are abnormal or out of specification with respect to those same parameters within the model, whether the output of the on-line process will meet desired quality metrics, etc. In fact, any analysis of the on-line data that uses the statistical model will first determine the stage or state of the statistical model that is most applicable to the on-line data currently being collected. It is only after the on-line data is aligned with the statistical model that further analyses can be performed, such providing an operator with screens to illustrate how the on-line process compares to the model, performing statistical analyses to determine whether the process is operating normally or within bounds or whether the process is operating abnormally and/or whether the output of the process is predicted to meet desired quality metrics, such as desired consistency, concentrations, etc.

As one example, once the data for the current on-line process is collected and the state of the process is determined, the analytic processor 114 of the OMS 102 may provided a series of different graphs or other displays to the user to enable the user to determine the current operational stage or viability of the on-line process run. Some of these graphs or displays are discussed below, it being understood that other displays, analyses or information may also or alternatively be provided to a user, such as an operator, maintenance personnel, etc. As one example, the analytic processor 114 may generate a contribution graph by calculating contributions of process parameters and/or quality parameters to the overall quality variable, or to the multivariate statistical fault indicators of modeled and un-modeled process variations. The contributions of the process and/or quality parameters may be displayed as a modeled and/or an unmodeled variation of each variable as a contribution to the variation associated with the overall quality and/or the quality parameter associated with the fault.

Furthermore, the analytic processor 114 may generate variable trend graphs for any of the selected process and/or quality variables, jointly with a defined threshold. The variable trend graph may show values associated with the variable over a time of the process in relation to values of the variable during similar times in previous processes, e.g., the model variable values. By generating the contribution graph and/or the variable trend graphs, the analytic process 114 may also identify possible corrections to the process to mediate the detected fault in the process. The variable trend graph may assist an operator to determine a cause of a process fault by providing an overlay of historical plots of data of the process runs used to create the model with associated variations (e.g., standard deviations) with the current value aligned to the same time scale.

The analytic processor 114 may also generate a quality prediction graph to determine the effect of the correction(s), if implemented, on the overall quality of the process. If the correction(s) maintain or improve the overall quality to within specified thresholds, the analytic processor 114 may instruct the OMS 102 to implement the correction(s). Alternatively, the analytic processor 114 may send instructions to the controller 108 to implement the process correction(s).

Further, the example analytic processor 114 may generate a microchart upon determining a fault associated with an overall quality parameter and/or any other quality parameter. The microchart may include values of the process and/or quality parameters at a specified time (e.g., a time associated with the process fault) in relation to a mean value and/or a standard deviation for each of the parameters as predicted by the process model. Additionally, the microchart may include spark lines that indicate prior values associated with each of the process and/or quality variables associated with the model. From the microchart, the example analytic processor 114 may enable an operator to determine and/or select one or more corrective actions to the process and/or determine if any of the corrections will improve the process such that the overall quality variable is predicted to be within the specified limits.

The OMS 102 manages access to the process control data including the process variation graphs, contribution graphs, variable trend graphs, quality prediction graphs, and/or microcharts via an online data processor 116. Additionally, the online data processor 116 provides access to process control operators to view process control data, change and/or modify process control data, and/or generate instructions for field devices within the process control system 106.

To provide access to the on-line analysis, the plant 104 of FIG. 2 is illustrated as including a router 120 and a local workstation 122 communicatively coupled to the online data processor 116 via a local area network 124 (LAN). Further, the router 120 may communicatively couple any other workstations (not shown) within the plant 104 to the LAN 124 and/or the online data processor 116. The router 120, which may be communicatively coupled to the other workstations wirelessly and/or via a wired connection, may include any type of wireless and/or wired router as an access hub to the LAN 124 and/or the online data processor 116.

The LAN 124 may be implemented using any desired communication medium and protocol. For example, the LAN 124 may be based on a hardwired or wireless Ethernet communication scheme. However, any other suitable communication medium and protocol could be used. Furthermore, although a single LAN is shown, more than one LAN and appropriate communication hardware within the workstation 122 may be used to provide redundant communication paths between the workstation 122 and a respective similar workstation (not shown).

The LAN 124 is also illustrated as being communicatively coupled to a firewall 128 which determines, based on one or more rules, whether communication from remote workstations 130 and/or 132 is to be permitted into the plant 104. The remote workstations 130 and 132 may provide operators that are not within the plant 104 access to resources within the plant 104. The remote workstations 130 and 132 are communicatively coupled to the firewall 128 via a Wide Area Network (WAN) 134.

The workstations 122, 130 and/or 132 may be configured to view, modify, and/or correct one or more processes within the process control system 106 based on the on-line analysis performed by the OMS 102, or these workstations may directly implement the on-line process analysis applications and methods described herein. For example the workstations 122, 130 and/or 132 may include a user interface 136 that formats and/or displays process control information generated by the OMS 102. As another example, the user interface 136 may receive generated graphs and/or charts or, alternatively, data for generating a process control graph and/or chart from the OMS 102. Upon receiving the graph and/or chart data in the respective workstation 122, 130, and/or 132, the user interface 136 may generate a display of a graph and/or a chart 138 that is relatively easy for an operator to understand. The example configuration of FIG. 2 illustrates the workstation 132 with the analytic user interface 136. However, the workstations 122 and/or 130 may include two analytic user interfaces 136.

Additionally, the user interface 136 may alert a process control operator to the occurrence of any process control faults within the process control system 106 and/or any other process control systems within the plant 104 as determined by the on-line analysis described herein. Furthermore, the user interface 136 may guide a process control operator through an analysis process to determine a source of a process fault and to predict an impact of the process fault on the quality of the resultant product. The user interface 136 may provide an operator with process control statistical information as the process fault is occurring, thereby enabling the operator to make any adjustments to the process to correct for any faults. By correcting for faults during the process, the operator may maintain a quality of the resulting product.

Additionally, the user interface 136, via the example OMS 102, may display the detection, analysis, corrective action, and quality prediction information. For example, the user interface 136 may display a process overview chart, a process variation graph, a microchart, a contribution graph, a variable trend graph, and/or a quality prediction graph (e.g., the graphs 138). Upon viewing these graphs 138, the operator may select additional graphs 138 to view multivariate and/or statistical process information to determine a cause of a process fault. Additionally, the user interface 136 may display possible corrective actions to a process fault. The user interface 136 may then allow an operator to select (one or more) corrective actions. Upon a selection of a correction, the user interface 136 may transmit the correction to the OMS 102, which then sends an instruction to the controller 108 to make the appropriate correction in the process control system 106.

The workstations 122, 130 and/or 132 of FIG. 2 may include any computing device, for example, a personal computer, a laptop, a server, a controller, a personal digital assistant (PDA), a micro computer, etc. The workstations 122, 130 and/or 132 may be implemented using any suitable computer system or processing system. For example, the workstations 122, 130 and/or 132 could be implemented using a single processor personal computer, single or multi-processor workstations, etc.

The process control environments 10 of FIG. 1 and 100 of FIG. 2 are provided to illustrate types of process control systems or process plants within which the example process quality prediction and fault detection methods and apparatus described in greater detail below may be advantageously used. However, the example methods and apparatus described herein, if desired, may be advantageously employed in other systems of greater or less complexity than the example process control environments 10 and 100 and/or the process control system 106 shown in FIGS. 1 and 2 and/or systems that are used in connection with process control activities, enterprise management activities, communication activities, etc.

As way of background, many known process control systems typically provide analytic and/or statistical analysis of process information. However, these systems generally implement offline tools to determine the cause of and potential corrective actions needed for process faults or other process conditions that may affect the quality of products being produced by the process. These offline tools may include process studies, lab studies, business studies, troubleshooting, process improvement analysis, and/or six-sigma analysis. While these tools may correct the process for subsequent products, the tools cannot remediate and/or correct process quality as the fault occurs. Thus, these offline tools do not prevent manufacturing poor quality products.

The example on-line process control system analyses described herein, on the other hand, may be used within a process control system to provide in-process fault detection, analysis, and/or correction information enabling an operator to correct a process fault or to increase product quality while the product is still being manufactured. In other words, process corrections can be implemented in response to predicted faults or predicted quality measures, during operation of the process, such as at the time a fault occurs or substantially immediately after a fault or other process upset leading to poor quality occurs. While the example methods and apparatus described herein may be used to predict and/or correct process faults or to account for changes in disturbance variables of the process to improve process quality of a continuous and/or a batch process, they will be particularly described with respect to continuous processes.

Generally speaking, the process quality prediction and fault detection analytics described herein are used to perform quality prediction and fault detection on processes (such as continuous processes or batch processes) that operate in one of a number of different process states (also referred to herein as process stages), without needing to create a new or different process model for each of the various different process states. More particularly, a method and system for performing process quality prediction and fault detection analytics includes a user interface application that first allows a user to select the type of statistical model to be used to perform quality prediction within a process. This quality prediction may be, for example, based on a neural network (NN), a multiple linear regression (MLR), or a partial least squares (PLS) model. The method and system for performing process quality prediction and/or fault detection analytics then generates this model for the process, and additionally may generate a fault detection statistical model, preferably in the form of a principal component (PCA) model. The system may use an application of Hotelling's $T^2$ and Q statistics, also known as the squared prediction error (SPE), to determine fault conditions associated with measured and unmeasured process disturbances.

In the past, a major constraint on the application of NN, MLR, PLS and PCA analyses arose from the fact that the underlying prediction technology was based on determining deviations of processes measurements from their mean value. Unfortunately, an increase in plant production rate or a change in product grade (or a change in some other disturbance variable of the process) typically caused mean values of process parameters to shift. To account for these changes, previous continuous data analytic applications needed to generate a different model to perform quality prediction or fault detection at different values of plant production rates, product grades, etc. As a result, traditional techniques of using NN, PLS, MLR, and PCA models could generally only be applied to perform quality prediction and fault detection in a continuous process that was operated at a constant throughput and that only made one product grade, because the mean value associated with the process measurements remained nearly constant only in this situation.

However, in many cases, the throughput of a continuous process is frequently changed to maintain an inventory level set by downstream processes or market demand. A swing boiler in the power house area of a plant is one example of a process that must constantly respond to changes in throughput demand set by the plant master. The process operating points may also change with the product grade that is being manufactured. One example of this situation is in a continuous reactor in which the target for output composition is changed to allow different product grades to be manufactured. To shift the output composition, it is often necessary to change the operating point of one or more process inputs. In response to these feed stock or process input changes, other parameters such as cooling water flow, agitator power, relief flow, etc. must also be changed to maintain controlled inputs (such as batch temperature, constant agitation, and overhead pressure) at constant values.

Generally speaking, the modeling techniques described herein account for changes in the mean values of the process measurements by automatically modifying the measurement mean values used in the analytics. These modeling techniques are thereby able to compensate for changes in production rate or product grade (or other disturbances in the process) without rebuilding or regenerating the process model used to make predictions. Advantageously, the modeling techniques described herein also compensate the deviation values used in the model to account for the time required to transition from different throughputs and product grades (or other disturbances in the process) thereby enabling a single statistical model to be used to perform quality prediction or fault detection during operation of the process at different product throughputs, when the process is operated to make different product grades, and even for times during which the process is in transition between different throughputs and product grades.

More particularly, to minimize any deviations in quality parameter prediction and to prevent false indications of a fault, the mean values used in model analytics are changed to match those expected for a given throughput or product grade. Also, because the transition from one operating point to another may take some time after the throughput or product grade is changed, filtering is applied to the calculation of the deviation from the mean, with this filtering being based on the normal time that is required for the process to respond to a grade or throughput change.

As a general matter, the quality prediction and fault detection techniques described herein for continuous or batch processes use process state segregation and includes two basic steps, namely, model generation and on-line use of the model to perform process quality prediction and/or fault detection. Additionally, if desired, process models may be adaptively adjusted (on-line) when, for example, the process enters a state or stage for which little no data was collected from the process when building the model in the first place or when the process has changed from the time during which the data used to build the model was collected from the process.

Figure 3:
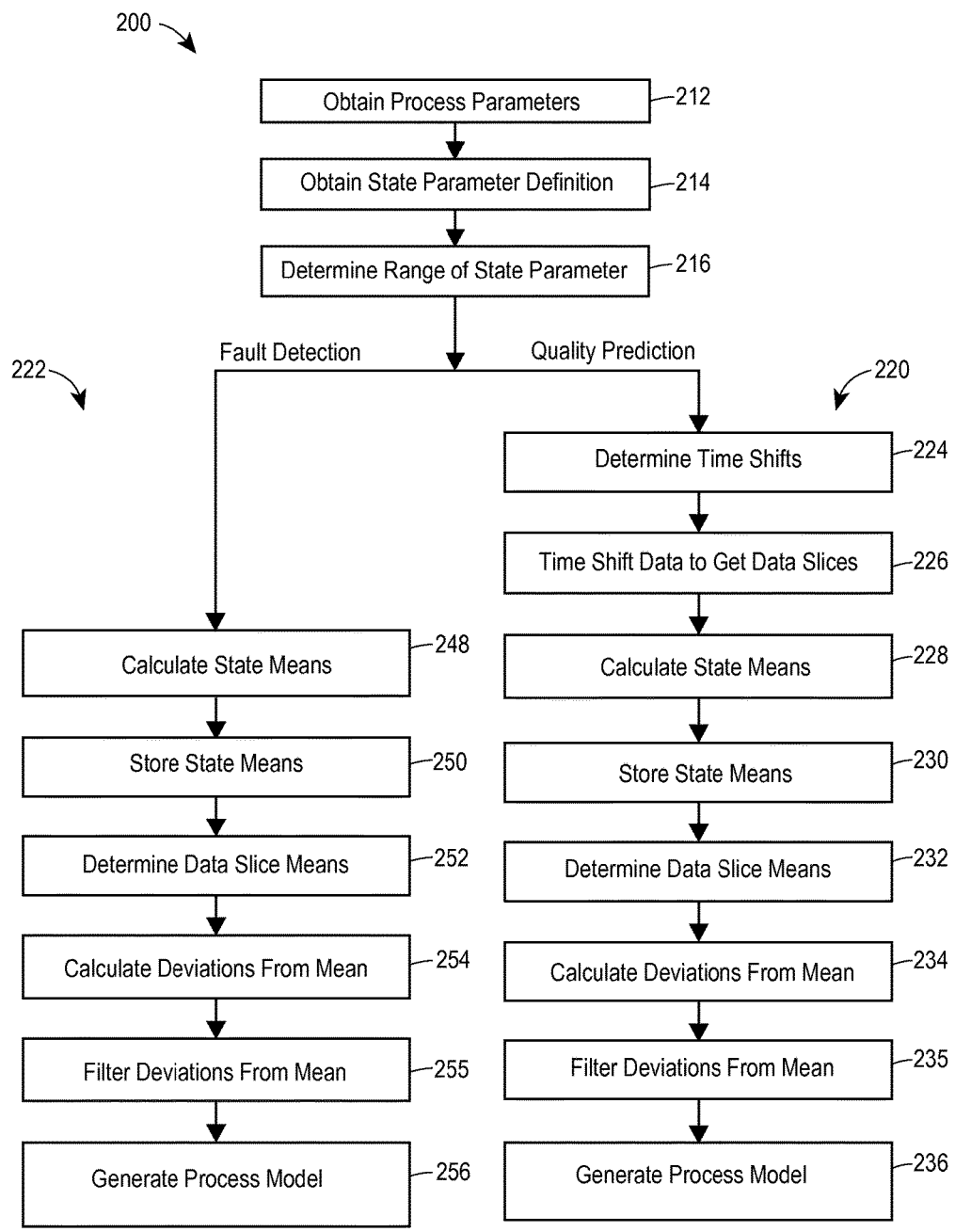
FIG. 3 is a process flow diagram illustrating a method of generating one or more quality prediction models and fault detection models.

FIG. 3 illustrates an example flow diagram 200 of a method or technique that may be implemented by, for example, the OMS 102 (which may be executed in, for example, one or more of the routines 50 of FIG. 1) or within one or more of the workstations 13 of FIG. 1, to develop one or more statistical models for use in quality and fault prediction in a process. The statistical models developed using the techniques of FIG. 3 can thereafter be used to analyze on-line data collected from a process to perform product quality prediction and/or process fault detection.

While the flow chart 200 of FIG. 3 is described as using collected process data to generate both quality prediction models, such as PLS, NN and MLR models, and fault detection models, such as PCA models, for use in analyzing a process, fewer or more types of models could be generated instead or in addition to these particular types of models. In particular, the method 200 of FIG. 3 could be used to generate only quality prediction models, only fault detection models, or any combination of both types of models. Also, while the method 200 of FIG. 3 will be described as producing each of a set of PLS, NN and MLR models as quality prediction models, and a PCA model as a fault detection model, other types of statistical models could be developed as quality prediction models and fault detection models as well or instead. Moreover, the method 200 of FIG. 3 could be used to develop only one or two types of these models and need not develop all of these types of models.

Referring now specifically to FIG. 3, a block 212 obtains process parameter data and quality parameter data for a process. As noted above, the process may be either a continuous or a batch process, but for the sake of description, the process will be described herein as a continuous process. Thus, prior to or during the model development technique depicted in FIG. 3, the process is operated and generates process parameter data for each of a set of process parameters or process variables, one of which will be referred to herein as a state parameter or state variable. Additionally, quality parameter data (also referred to as quality variable data or result variable data) indicative of the quality variables or quality parameters to be predicted when implementing on-line quality prediction and fault detection for the process are collected from the process during the times that the process parameter data is developed or collected. The process parameter data and the quality parameter data is stored in a memory as a set of model training data, referred to herein as training data.

Importantly, when generating or collecting the training data to be used in the model development technique of FIG. 3, the process from which the data is collected is preferably operated over a number of different process stages or process states corresponding to different values or ranges of the state parameter. In this case, the training data is collected for each of the process parameters and the quality parameters numerous times during operation of the process so that, preferably, process parameter data and quality parameter data is collected for each of the states of the process, i.e., while the process is operating in each of the different defined process states, as well as while the process is transitioning between states. Of course, the training data may be obtained during normal or planned operation of the process over any desired time periods, with these time periods being either contiguous or being non-contiguous if so desired. The process parameter data and the quality parameter data may include process parameter values (including quality parameter values) that are measured or otherwise collected real-time within a process, process parameter values (including quality parameter values) that are generated using off-line techniques, such using lab analyses, process parameter values (including quality parameter values) input by or obtained from a user via, for example, a user interface, or data obtained in any other desired manner.

At a block 214 of FIG. 3, the model development technique 200 determines or obtains an indication of the process state parameter or state variable to be used when constructing the quality prediction and fault detection model(s). This state parameter or state variable may be predetermined or preset by, for example, an engineer and stored as part of the model development system, may be specified or selected by a user via, for example, a user interface (e.g., one of the user interfaces 13 of FIG. 1) or may be determined in any other desirable manner. Generally, the process state parameter will be chosen to be a significant disturbance variable, such as the throughput of the process, an indication of the product grade or product type being produced by the process, etc. In some cases, however, the state parameter may be calculated using or determined from two or more process parameters or other process measurements. For example, the average value of two process parameters may be used as the state parameter. In other examples, other statistical techniques may be applied to calculate a state parameter using any desired inputs from the process, to determine a state parameter that indicates the state of process operation at any particular time. The state parameter may be a continuous variable or a discrete variable. In one example, the user is allowed to configure a state parameter that reflects changes in a major disturbance to process operation. In some cases this state parameter will be a continuous parameter such as the production rate or the throughput of the process. However, in other cases, the state parameter may be a discrete parameter such as an indication of one of a limited set of discrete product grades being made. In general the user may select a single measured or calculated process parameter as the state parameter, may indicate if this state parameter is a continuous or discrete parameter, and may specify the number of states or stages that will be used in data analytics. By default, for example, the selected parameter may be assumed to be a continuous parameter and the number of states may be assumed to be a fixed number, such as five.

At a block 216, the technique 200 determines ranges or values of the state parameter that define each of the different process states or stages. The block 216 may also determine the number of process states to be used in generating quality prediction and fault detection models if this variable has not already been set. As indicated above, the ranges of the state parameter associated with each of the different process states may be selected or specified by a user such as an operator, a process engineer, etc. These ranges may indicate different values of the state parameter (in the case in which the state parameter is a discrete variable) or different ranges of values of the state parameter (in the case in which the state parameter is a continuous variable) associated with each of the process states. As an example only, the state parameter may be broken down into, for example, 5 to 10 different ranges. If desired, the block 216 may automatically determine process states ranges associated with the state variable by determining the overall range of the state parameter from the training data and then splitting this range into a set of ranges, such as a set of equal ranges.

When a complete set of training data has been collected and stored for the process and the state parameter and its associated ranges or values have been defined to thereby define the process states, the training data is used to develop one or more quality prediction models and/or fault detection models to be used analyze future on-line operation of the process. The technique of generating quality prediction models is slightly different than the technique of generating fault detection models, and so these two techniques are illustrated separately in FIG. 3 using two different branches.

Generally speaking, a branch 220 of FIG. 3 illustrates the steps used to develop quality prediction models, such as PLS models, NN models and MLR models, while a branch 222 illustrates the steps used to develop fault detection models, such as PCA models. When developing a quality prediction model, a block 224 determines time shifts for the training data for the different process parameters, including the state parameter, representing a manner of time shifting these parameters with respect to one another or with respect to the quality parameter, to align the process parameter data in a manner that is best aligned in time with the quality parameter data. This time alignment provides for a prediction model that performs better predictions.

In particular, during the development of quality prediction models (e.g., the NN, MLR, and PLS models) for each of the quality parameters to be predicted, the deviation values used to produce the model are shifted in time to account for the time required for a change in an input to a process model (i.e., a change in one of the process parameter values) to impact the quality parameter being predicted by the model. As will be understood, this delay may be, and usually is, different for each of the process parameters being used as inputs to the quality prediction model. (Similarly, these same delays will be taken into account in the processing of the deviation values used for on-line quality parameter prediction.)

One manner of identifying the delay associated with each process parameter performs a cross correlation between each of the process parameters and the quality parameter to be predicted. In this case, for the selected data set that includes all process inputs (including the state parameter), the block 224 may perform a cross correlation between each process parameter used to produce an input to the model being developed and the process output that reflects or is best correlated with the quality parameter being predicted (which may be obtained using, for example, on-line measurements, off-line lab analyses, etc.) The results of the cross correlation may be used to establish the time delay to be associated with a particular process parameter (an input to the model) by determining the time shift that results in the maximum correlation value when performing cross correlation between the quality parameter and the particular process parameter. Of course, each different process parameter may have a different time shift associated therewith. Generally speaking, using this technique, the block 224 determines the highest cross correlation value between a particular quality measure and each process parameter for each of the different process parameters, and then determines a time-shift for that process parameter based on the time delay at which the highest cross correlation value is obtained.

Figure 4:
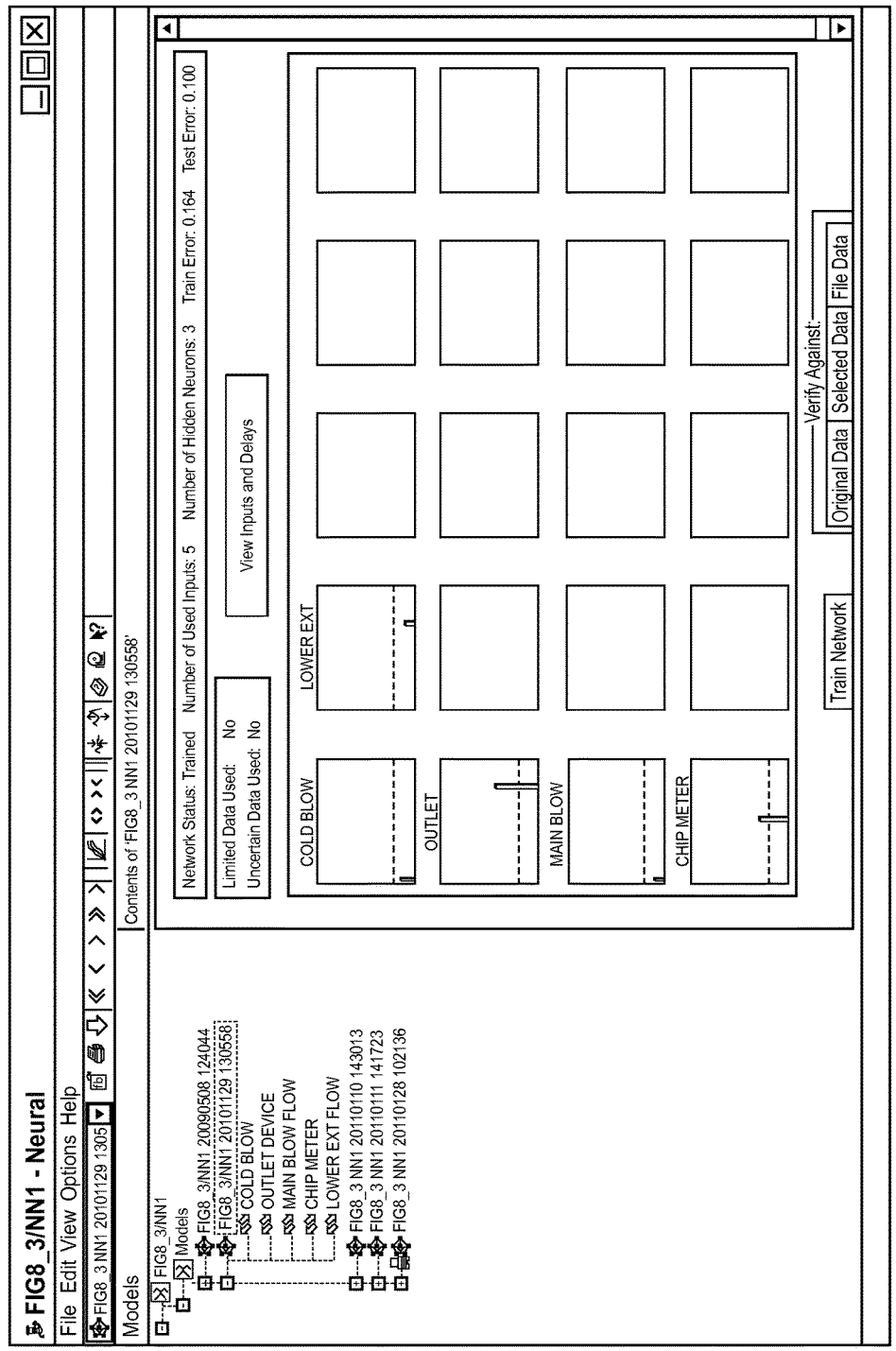
FIG. 4 is a graph of a set of cross correlation plots illustrating the cross correlations between a set of process parameters and a quality parameter used to generate a quality prediction model.

One example of a manner in which cross correlation may be used to determine time shifts to be used to develop a quality prediction model is illustrated in a situation in which a Kappa number associated with the output of a Kamyr digester is predicted based on process inputs. In this example, a chip meter speed is selected as a state parameter because it sets the process throughput. The Kappa number of the product output may be measured using a sampled analyzer or by analyzing a grab sample in the lab. The delay associated with each process input being reflected in the Kappa number is automatically determined by performing a cross correlation between the process inputs and Kappa number contained in a selected data set. The results of such a cross correlation determination for each of the inputs of the digester, labeled Cold Blow, Outlet, Main Blow, Chip Meter and Lower Ext, are displayed in FIG. 4.

Figure 5:
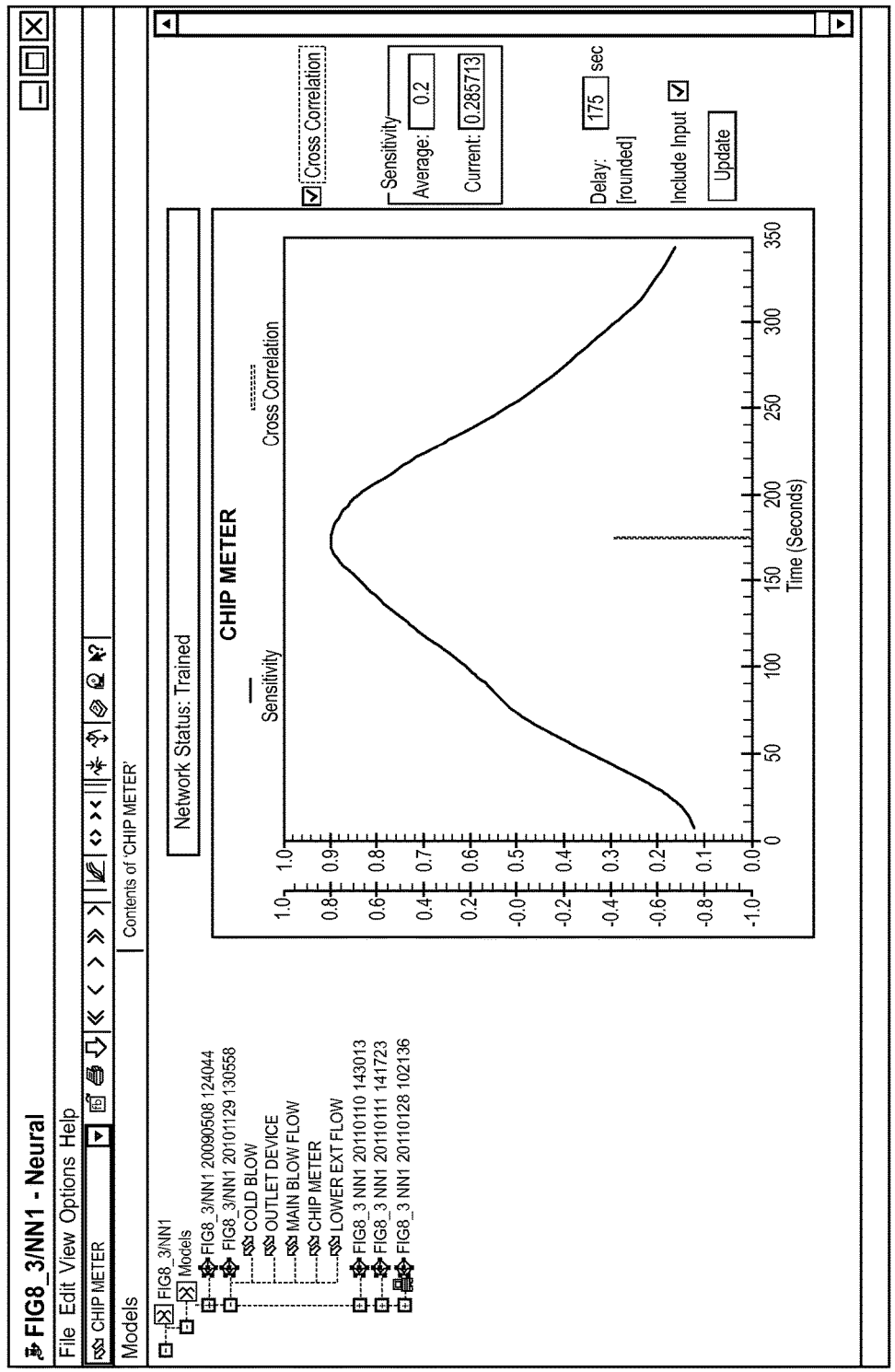
FIG. 5 is an enlarged view of one of the cross correlation plots of FIG. 4 illustrating a delay time between a change in a process parameter and a change in a quality variable as determined by a cross correlation function.

Now, by selecting a process input, a user may see the cross correlation between the process input and the Kappa number. FIG. 5 illustrates the cross correlation between the state parameter, chip meter speed, and the analysis of Kappa number in more detail. As illustrated in the plot of FIG. 5, the delay associated with a process input is establish based on the time shift that provides maximum correlation. In this simulation of a Kamyr digester, the delay between the chip meter speed changing and this change being reflected in the Kappa number is 175 seconds. Of course, an actual process the delay could be much longer. Delays or time shifts for each of the other input parameters could be determined in a similar manner and these delays can then be used as the time shift amounts in the block 224 of FIG. 3.

After all of the process parameter and state parameter time shifts have been determined, a block 226 uses the time shifts determined in the block 224 to time shift the process parameter data for each process parameter input to the model and the state parameter, and stores this time shifted parameter data in a memory. In particular, the block 226 stores sets of time shifted data slices, wherein each time shifted data slice has a value for each of the process parameters to be used to generate the model, a value of the state parameter and a value of the quality parameter. The measurements of the process parameters and the state parameter of a particular data slice are time shifted with respect to measurement of the quality parameter by the time shift amounts determined at the block 224. The resulting time shifted parameter data for the different process parameters and the state parameter of each time shifted data slice appear to be time coincidental. That is, a change in a process parameter input is immediately reflected in the quality parameter in each time shifted data slice.

Next a block 228 uses the time shifted data developed by the block 226 to calculate the average values for each process parameter (including the state parameter) and the average value for the quality parameter while in each of the defined process states. More particularly, the block 228 culls through all of the time shifted data slices and uses the value of the state parameter in each data slice to determine which particular process state each data slice falls within based on the process state ranges of the state parameter. The block 228 then averages all the values of each process parameter, the state parameter and the quality parameter of all of the data slices in a particular process state to determine a separate mean value for each process parameter, for the state parameter and for the quality parameter for the particular process state. These means are referred to herein as the process state means.

A block 230 then stores these average or mean values of the process parameters, the state parameter and the quality parameter for each process state in a memory for later use in developing the quality prediction model, as well as in using the quality prediction model once developed.

Thereafter, for each data slice (also called a time slice), a block 232 uses the time shifted data of that time slice and the process state means to determine a set of means to use when determining a set of deviations from the mean for that time slice. In particular, the block 232 selects a time slice of data to process to determine a set of means to use for that time slice to thereafter determine the deviations from the mean for that time slice, with the deviations from the mean being inputs to a model generation routine to be used in developing the quality prediction model. More particularly, for each time slice, the block 232 uses the instantaneous value of the state parameter indicated by (stored for) that time slice and the mean values of the state parameter determined for one or more of the process states to determine a scaling factor (e.g., an interpolation factor) to use to determine the appropriate mean values for each of the other process parameters of the time slice.

In the case in which the state parameter is a discrete variable that is directly correlated with the process states (i.e., one different value of the state parameter is associated with or defined for each different process state), then the value of the state parameter defines or uniquely determines the process state in which the process is operating (for that time slice) and the means of the process parameters for that time slice are simply determined as the process parameter means stored for that process state. However, if the state parameter is a continuous variable or the user has defined a range of values of the state parameter to be associated with each of the process states (i.e., a range of state parameter values is defined for each process state), then the block 232 determines an interpolation factor defining a fraction of two states in which the instantaneous value of the state parameter (of the time slice) currently lies. That is, if the instantaneous value of the state parameter is equal to the mean value of the state parameter for a particular process state, the time slice is squarely within a single process state and the process parameter means stored for that process state can be used as the means for the other process parameters of that time slice.

However, if the instantaneous value of the state parameter falls between the state parameter means of two different (e.g., two adjacent) process states, then the means for the other process parameters of the time slice will be determined as a combination of the process parameter means stored for those two process states. Typically, the mean for each process parameter to use for the time slice will be determined by interpolating between the parameter means for that parameter of the two adjacent process states using an interpolation factor developed from the instantaneous state parameter value. That is, an interpolation routine may determine the percentage of each of the two process states in which the time slice exists based on the relative distance of the instantaneous value of the state parameter (of the time slice) and the two nearest mean values of the state parameter (from two different process states). The block 232 can perform the interpolation (using the same interpolation factor) for each of the process parameters in the time slice using the stored process parameter means for the two adjacent process states. As a result of this operation, the block 232 determines the appropriate mean value to use (for each process parameter of the time slice) in calculating the deviations from the mean for that time slice to be used to create a process model. The block 232 will perform this interpolation for the quality parameter of the time slice as well. Thus, for each process parameter and the quality parameter of a time slice, the block 232 will use the determined fraction within state and the state means of two adjacent process states to determine the mean value of the process parameters for the time slice.

One example of performing interpolation to determine a set of time slice means for a particular time slice will now be described in more detail. In this example, it is assumed that the range of variation of the state parameter is calculated from the training data to determine the entire operating range for the state parameter. By default this operating range is automatically divided into a number of equal segments that represent the different states of the process considered in analysis. In another case, the user could specify the entire range of the state parameter, the number of process states or stages, and the particular sub-ranges of the state parameter associated with each of the process states. In any event, in this example, the average value of the state parameter for each process measurement during each of the defined process states or stages is determined and saved in memory. In this example, which relates to operation of a boiler process, the boiler steam demand is configured as the state parameter, and this variable is assumed to have varied over a range of 25-75% in the data set selected for model building. The values collected for other inputs, e.g., five parameter inputs of Fuel Flow, Air Flow, O2, Draft, and IS Fan Speed, included in the model appear as illustrated in Table 1 below.

TABLE 1

|  | State - Steam Demand | | | | |
| --- | --- | --- | --- | --- | --- |
|  | 1 | 2 | 3 | 4 | 5 |
| State Range | 25-35 | 35-45 | 45-55 | 55-65 | 65-75 |
| No. Sample in Range | 210 | 340 | 150 | 85 | 30 |
| Steam Demand - Ave | 30 | 40 | 50 | 60 | 70 |
| Fuel Flow - Ave | 30 | 40 | 50 | 60 | 70 |
| Air Flow - Ave | 35 | 45 | 55 | 65 | 75 |
| O2 - Ave | 2.5 | 2.5 | 2.5 | 2.5 | 2.5 |
| Draft - Ave | −1 | −1 | −1 | −1 | −1 |
| IS Fan Speed - Ave | 20 | 28 | 38 | 50 | 65 |

In this example, to determine the time slice means to be used to determine deviations from the mean for a time slice, the following procedure may be used. If the instantaneous value of the state parameter of the time slice is equal to the state parameter mean for a process state, then the state parameter means for the other process parameters of that process state will be used as the time slice mean values in calculating the parameter deviations from mean for that time slice. However, in most cases the state parameter value of a time slice will fall between the state parameter mean values for two process states. In this case, the state parameter mean values for these two process states will be used in conjunction with the process parameter mean values for these two process states to calculate the time slice parameter mean values. For the boiler example described above, if the state parameter value was 37 for one time slice, then, based on the state parameter mean values saved for the process states, the mean value for the air flow parameter could be determined for that time slice using standard interpolation techniques as follows:

$$\text{Air Flow Mean} = \left(\frac{37-30}{40-30}\right) \times (45-35) + 35 = 42$$

When the state parameter is product grade (a discrete parameter with enumerated values, e.g. 1-5), then, during model development, the parameter mean value for each state can be calculated for the data samples that coincide with the state parameter being in that state. For example, the mean values that were established for a continuous reactor might appear as shown below in Table 2.

TABLE 2

|  | State | | | | |
| --- | --- | --- | --- | --- | --- |
|  | 1 | 2 | 3 | 4 | 5 |
| Grade Description | ADX201 | ADX210 | ADX215 | ADX230 | ADX240 |
| Sample in State | 210 | 340 | 150 | 85 | 30 |
| Primary Flow - Mean | 70 | 90 | 60 | 80 | 75 |
| Secondary Flow - Mean | 25 | 35 | 30 | 45 | 50 |
| Product Concentration - Mean | 35 | 40 | 30 | 45 | 42 |
| Reactor Temp - Mean | 210 | 215 | 205 | 211 | 200 |
| Cooler Out Temp - Mean | 180 | 185 | 174 | 200 | 190 |
| Reactor Press - Mean | 10 | 10 | 10 | 10 | 10 |

If the state parameter value was 3 (ADX215), then the mean value for primary flow would be 60. If the state parameter value changed to 1 (ADX201) then the mean value for primary flow would be 70. Any changes in state will not be immediately reflected in the process parameters.

After the mean values for each time slice (referred to a slice means) are determined, a block 234 uses the calculated time slice means to calculate a deviation from the mean for each of the process parameters and the quality parameter within the time slice. In particular, the block 234 will determine the difference between each process parameter value (and quality parameter value) of the time slice and its associated time slice mean (as determined in the block 232) to produce a set of deviations from the mean, with one deviation from the mean being determined for each process parameter (except the state parameter) and quality parameter in the time slice. The deviations from the mean for each time slice may then be stored in a memory.

A block 235 next filters each string of deviations from the mean separately. This filtering process makes the process model being generated more robust, and helps to prevent the model from detecting quality problems when the process is simply moving between states. The block 235 may implement a low pass filter for each process parameter, the state parameter and the quality parameter. The low pass filters may use a filter time constant is set equal to or greater than the longest response time of the quality parameter to a change in any of the process parameters used as inputs to the model being constructed. Of course, other filter time constants could be use as well and these time constants could be selected based on response times that are less than the longest response time of the quality parameter.

As one example of filtering, a first order filter can be applied based on the configured transition time of the process (in seconds). For example, the Air Flow deviation from the mean of the example of Table 1 above could be calculated as:

$$\text{Air Flow Dev}_n = F \times ((\text{Air Flow}_n - \text{Air Flow Mean}_n) - \text{Air Flow Dev}_{n-1}) + \text{Air Flow Dev}_{n-1}$$

Where the filtering factor F is:

$$F = \frac{\Delta T}{\Delta T + \tau}$$

and where
ΔT=Period of Execution (sec)
τ=Transition Time (sec)

The filtered deviations from the mean are then provided to a block 236, which uses the filtered deviations from the means to determine or to generate the process model, e.g., the NN, MLR, and/or PLS model, to be used in later quality prediction operations. Any desired technique for creating these models may be used and these techniques are well known. Thus, the method of generating models from the deviations from the mean will not be described in detail herein. However, as part of the process model generation, the determined process parameter means (including the state parameter means) and the quality parameter means determined for each of the process states (i.e., the process state means) as well as the state parameter ranges for each process state are stored as part of the process model and will be used when using the process model to perform quality prediction in an on-line process. Additionally, the filter time constants and the time shift values may be stored as part of the process model.

A method of creating a fault detection model will now be described with reference to the branch 222 of FIG. 3. Generally speaking, the technique of creating a fault detection model illustrated in the branch 222 is similar to the technique of creating a quality prediction model in many respects. However, the fault detection model will be developed from training data that has not been time shifted or time aligned, as this model will be used to make a future fault prediction (instead of a prediction of the process quality at any particular time). In all other respects, the training data is processed in the branch 222 very similarly to the manner in which the time aligned data slices are processed in the branch 220.

Thus, a block 248 uses the training data collected for the process and calculates the average or mean values for each process parameter (including the state parameter) and the average value for the quality parameter for each of the defined process states. Because the block 248 is operating on time slices of the raw training data instead of the time aligned data, the means calculated in the block 248 may be different than the means calculated in the block 228. A block 250 then stores these average or mean values of the process parameters and the quality parameter in a memory as process state means for later use in developing the fault detection model as well for use in performing fault detection once the model is developed.

Thereafter for each time slice of training data, a block 252 uses the parameter data of that time slice and the process state means to determine a set of time slice means to use when determining deviations from the mean for that time slice. In particular, the block 252 selects a time slice of data to process to determine a set of means to use for that time slice to thereafter determine the deviations from the means for that time slice, with the deviations from the means being inputs to a model generation routine to be used in developing the fault detection model. More particularly, for each time slice, the block 252 uses the instantaneous value of the state parameter indicated by (stored for) that time slice and the process state mean values stored for the process states to determine a scaling factor (e.g., an interpolation factor) to use to determine the appropriate time slice mean values for each of the other process parameters of the time slice. This process is similar to that described for the block 232 and so will not be repeated here. In any event, the block 252 performs interpolation (using the same interpolation factor) for each of the process parameters in the time slice using the process state means for the process parameter from two adjacent process states to determine the appropriate time slice mean value to use in determining the deviation from the mean to be used to create a fault detection model from that time slice of data. The block 252 performs this interpolation for the quality parameter of the time slice as well.

After the time slice mean values for each data time slice, a block 254 uses the calculated time slice means to determine a deviation from the mean for each of the process parameters and the quality parameter within the time slice. In particular, the block 254 determines the difference between each process parameter (and quality parameter) of the time slice and its associated time slice mean (as determined in the block 252) to produce a set of deviations from the mean, with one deviation from the mean being determined for each process parameter (except the state parameter) and quality parameter of the time slice.

A block 255 then filters the deviations from the means to make the process model being generated more robust and to help prevent the model from detecting faults when the process is moving between process states. The block 235 may implement a low pass filter in which the filter time constant is set equal to or greater than the longest response time of the quality parameter to a change in any of the process parameters used as inputs to the model being constructed. Thus, in one example, to account for the time required for the process to respond to a state change, the deviations from mean can be filtered based on the transition time for the fault being detected. Of course, other filter time constants could be use as well, and these time constants could be selected based on response times that are less than the longest response time.

The filtered deviations from the means are then provided to a block 256 which uses the filtered deviations from the means to determine or to generate the fault detection model, e.g., a PCA model, to be used in later fault detection operations. Again, the process of creating a PCA model from a set of deviations from the mean for a set of parameters is well known and so will not be described herein in detail. However, as part of the process model generation, the determined process parameter means (including the state parameter means) and the quality parameter means determined for each of the process states (i.e., the process state means) as well as the state parameter ranges for each process state are stored as part of the process model and will be used when using the process model to perform fault detection in an on-line process. Additionally, the filter time constants may be stored as part of the process model.

Figure 6A:
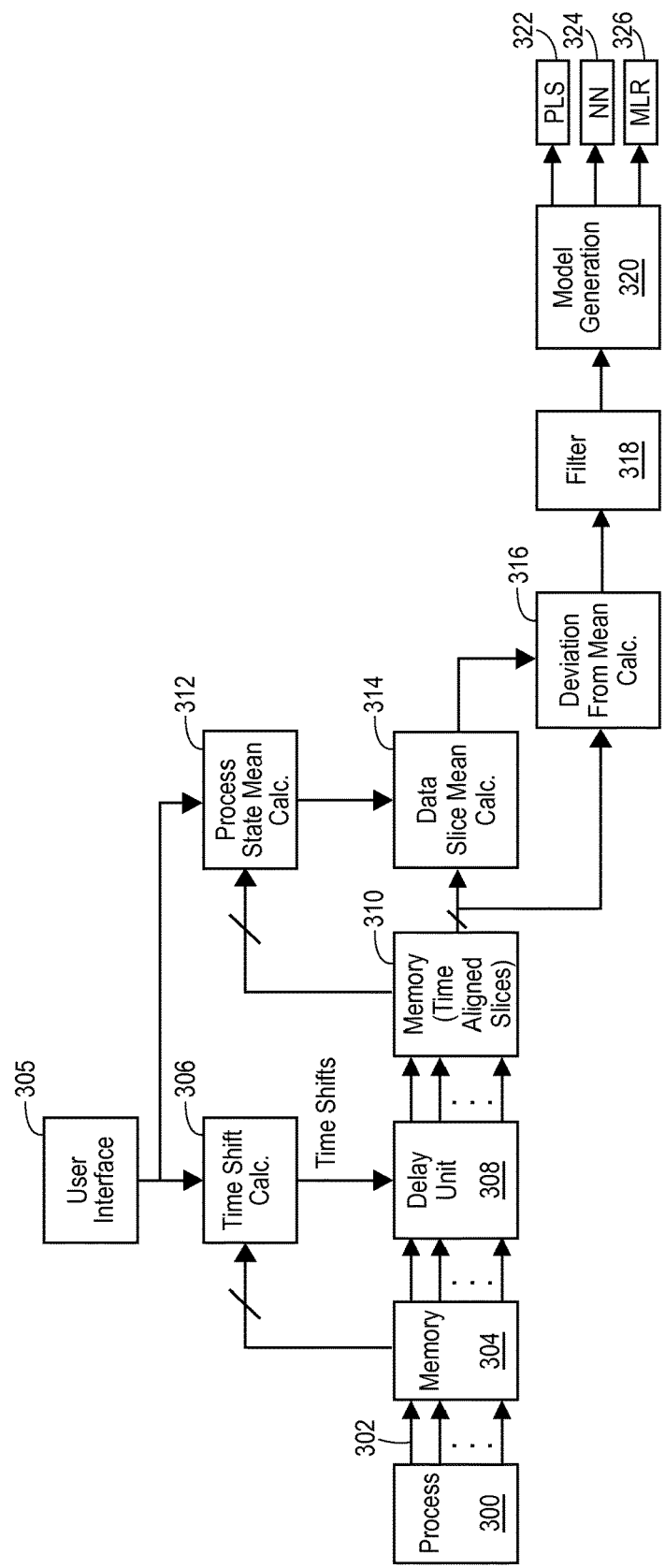
FIGS. 6A and 6B are hardware/software flow diagrams illustrating a system for developing one or more statistically based process models for use in performing process quality prediction or fault detection in a continuous or a batch process.

FIG. 6A illustrates a system for implementing the process quality prediction model generation technique 200 of FIG. 3. In particular, as illustrated in FIG. 6A, the process 300 operates in a training phase to generate process data in the form of process parameter data (including state parameter data) and quality parameter data for a significant number of times or samples. The process parameter data, indicated by the lines 302 of FIG. 6A, includes process parameter, state parameter and quality parameter data, e.g., process variable values, state variable values and quality variable values, that are measured or output by devices within the process 300 or that are otherwise collected from the process 300 during operation of the process 300. The process parameter data 302 is obtained and stored in a memory 304 as a set of training data. The memory 304 may be, for example, the data historian 12 of FIG. 1 or any other desired memory. Of course, data for any number of process parameters, quality parameters (including fault indications) and state parameters may be measured, collected and stored as part of the training data in the memory 304.

Next, a time shift calculation block 306 operates on the training data obtained from the memory 304 using the identity of the state parameter and the ranges of the state parameter values defining the different process states, the identity of the process parameters to be used as inputs for a model and the quality parameter to be estimated by the model. The block 306 may receive these indications from a user via a user interface 305, for example. The block 306 uses the indication of the quality parameter and the process parameters to be used in the model being constructed, and performs the cross correlation technique described above to determine the appropriate time shifts for each of the process parameters. Of course, the block 306 may perform the cross correlations automatically and automatically determine the appropriate time shift for each process parameter, or may receive input from a user via the user interface 305, which may enable a user to view and select the appropriate delay times for each of the process parameters.

After the time shifts have been calculated for each of the process parameters (and the state parameter), a time shift block or delay unit 308 receives the training data, and delays the various process parameter values of the different process parameters to be used in the model being constructed by the appropriate amounts and then stores the time aligned parameter data in a memory 310 as time aligned data slices. Each time aligned data slice will have a value for each process parameter used as inputs to the model being constructed, a value for the state parameter and an associated value for the quality indication being predicted by the model to be constructed, with the values of the process parameters and the state parameter being shifted in time (e.g., advanced or delayed in time) relative to the value of the quality parameter, based on the time shifts applied by the block 308.

As a result, the memory 310 will store time slices of data having values of the process parameters, the quality parameter and the state parameter time aligned such that time delays between the changes in the process parameters and the resulting changes in the quality parameter are reduced to the best extent possible. These sets of data slices are the best to use in generating the model to produce the most accurate quality prediction model.

Next, a block 312 analyzes the time slice data from the memory 310 and develops a set of process parameter and quality parameter means for each defined process state. The process parameter means for each particular process state will include, for each process parameter, the mean of the values of that process parameter from all of the time slices for which the state parameter value of the time slices falls with the particular process state. Likewise, the quality parameter mean for each particular process state will include, for the quality parameter, the mean of the values of the quality parameter for all of the time slices for which the state parameter value of the time slice falls with the particular process state. Similarly, the state parameter mean for each particular process state will include, for the state parameter, the mean of the values of the state parameter in all of the time slices for which the state parameter value of the time slice falls with the particular process state.

When the process state means have been determined for each process state from the entire set of time slices stored in the memory 310 (i.e., for the time aligned training data), a block 314 determines the process parameter and quality parameter means to use for each time slice (the time slice means) in determining a set of deviations from the mean for that time slice. As noted with respect to FIG. 3, the block 314 may use interpolation based on the instantaneous value of the state parameter for a time slice to determine the manner in which to interpolate between the process parameter means of two adjacent process states for each process parameter and the quality parameter in the time slice.

When the means for each time slice have been determined, these time slice means are provided to and used in a block 316, along with the aligned time slice data from the memory 310, to determine a deviation from the mean for each process parameter and the quality parameter of each time slice. The sets of deviations from the mean (one set of deviations from the mean being created for each aligned time slice) are then provided to a filter block 318 which filters the deviations from the means on a process parameter by process parameter basis to account for situations in which the process is changing from one state to another. Generally speaking the deviations from the mean may be filtered using a low pass filter with a time constant set based on the amount of time it takes the quality parameter to respond to changes in the process parameters. In one case, the longest response time may be used to set the filter constant. The filter constant will generally be the same for all of the deviations from the mean. Additionally, if desired, the filter time constant may be selected or specified by a user via, for example, the user interface 305.

The filtered deviations from the means are then provided to a model generation bock 318 which uses these values to produce a quality prediction model using standard model creation techniques. As indicated in FIG. 6A, the model generation block 320 creates one or more of a PLS model 322, a NN model 324 and an MLR model 326. Generally speaking, a single model will be created for each quality variable being predicted and these models may, of course, have different process parameter inputs. The model generation block 320 may store the model along with one or more of the process state means, the definitions of the process states (e.g., the ranges of the state parameter that define the various process states), the filter time constants, and the time shift values for each of the process parameters as part of the process model.

Figure 6B:
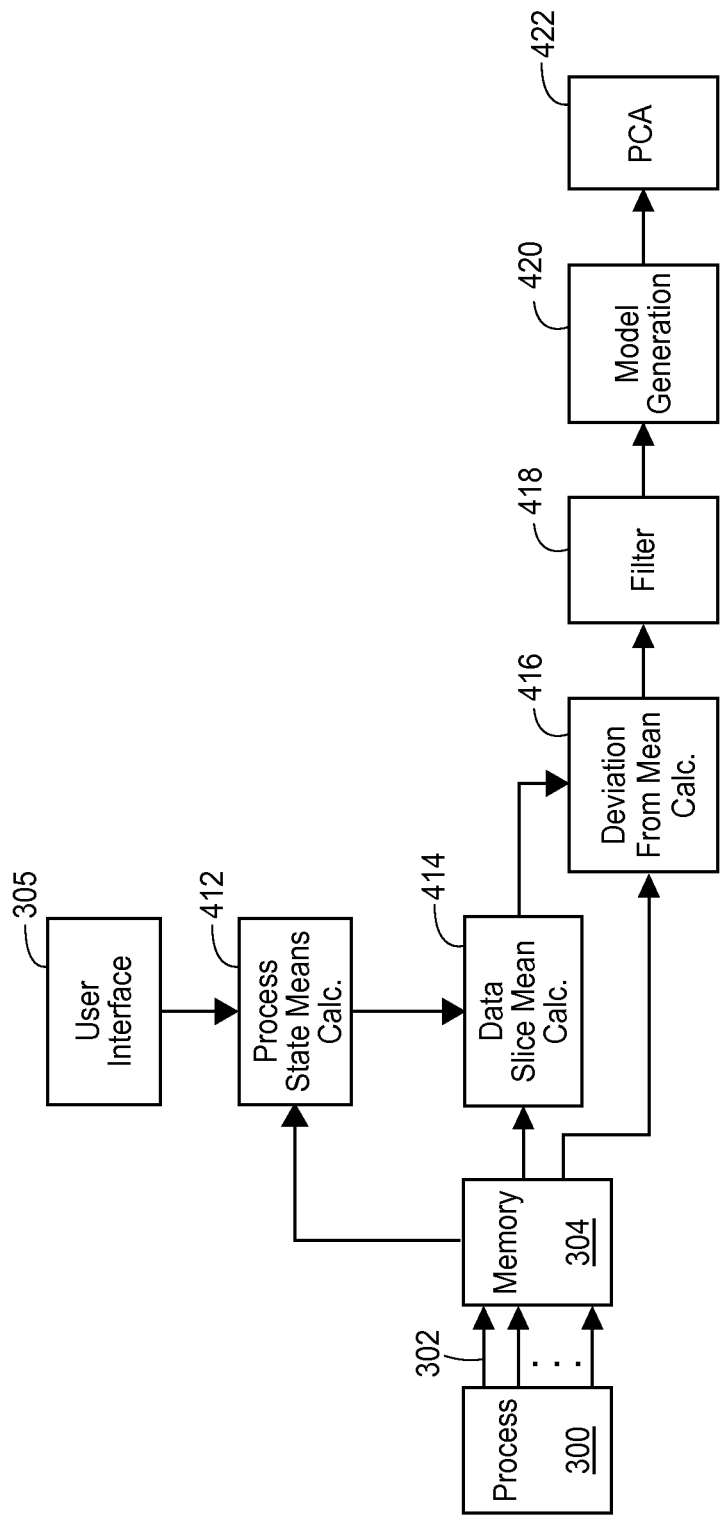

FIG. 6B illustrates a system for developing a fault detection model and includes the process 300, the training data memory 304, and the user interface 305 illustrated in FIG. 6A. However, in this case, a block 412 analyzes the time slice data of the raw training data in the memory 304 to develop a set of process parameter and quality parameter means for each defined process state. The process parameter means for each particular process state will include, for each process parameter, the mean of the values of the process parameter in all of the time slices for which the state parameter value of the time slices falls within the particular process state range. Likewise, the quality parameter mean for each particular process state will include, for the quality parameter, the mean of the values of the quality parameter in all time slices in which the state parameter falls within the process state. Similarly, the state parameter mean for each particular process state will include, for the state parameter, the mean of the values of the state parameter in all of the time slices for which the state parameter value of the time slice falls with the particular process state.

When the process state means have been determined for each process state from the entire set of time slices stored in the memory 304 (i.e., for the time slices of the training data), a block 414 determines the process parameter and quality parameter means to use for each time slice (the time slice means) in determining a set of deviations from the mean for that time slice. As noted with respect to FIG. 3, the block 414 may use interpolation based on the instantaneous value of the state parameter for a time slice to determine the manner in which to interpolate between the process parameter means of two adjacent process states for each process parameter and the quality parameter in the time slice.

When the time slice means for each time slice have been determined, these means are provided to and used in a block 416, along with the time slice data from the training data memory 304, to determine a deviation from the mean for each process parameter and the quality parameter of each time slice. The sets of deviations from the mean (one set of deviations from the mean being created for each time slice) are then provided to filter block 418 which filters the deviations from the mean to account for situations in which the process is changing from one state to another. Generally speaking the deviations from the mean may be filtered using a low pass filter with a time constant set based on the amount of time it takes the quality parameter to respond to changes in the process parameters. If desired, the filter time constant may be selected or specified by a user via, for example, the user interface 305 and may be the same filter time constant used in the filter block 318 of FIG. 6A.

The filtered deviations from the means are then provided to a model generation bock 420 which uses these values to produce a fault detection model using standard model creation techniques. As indicated in FIG. 6B, the model generation block 420 may create one or more PCA models 422. Generally speaking, a single PCA model will be created for each fault being detected and these models may, of course, have different process parameter inputs.

Of course, other types of quality prediction and fault detection models may be used and the model generation routines 314 and 414 may generate the PLS, NN, MLR and PCA models in any desired or known manner, as is typical. However, as will be understood, the quality prediction and fault detection models are preferably generated from the entire set of training data which, if possible, includes data associated with the operation of the process 300 over all of the predefined process state ranges. In any event, a single PLS model, NN model, MLR model or PCA model may be developed for the process 300 for performing each quality prediction and fault detection without individual models needing to be developed for each of the predefined process states. As will be understood, the PLS, NN, MLR and PCA models will be generated as typical models created for the process 300 according to standard model generation techniques, except that these models will also include a set of process state means associated with each of a different set of process states, as well as definitions of the state parameter and state parameter ranges defining various process states. In this case, each set of process state means will include a mean for each of the process variables and the state variable for which data is collected and, in quality prediction models, a mean for the quality parameter.

Figure 7:
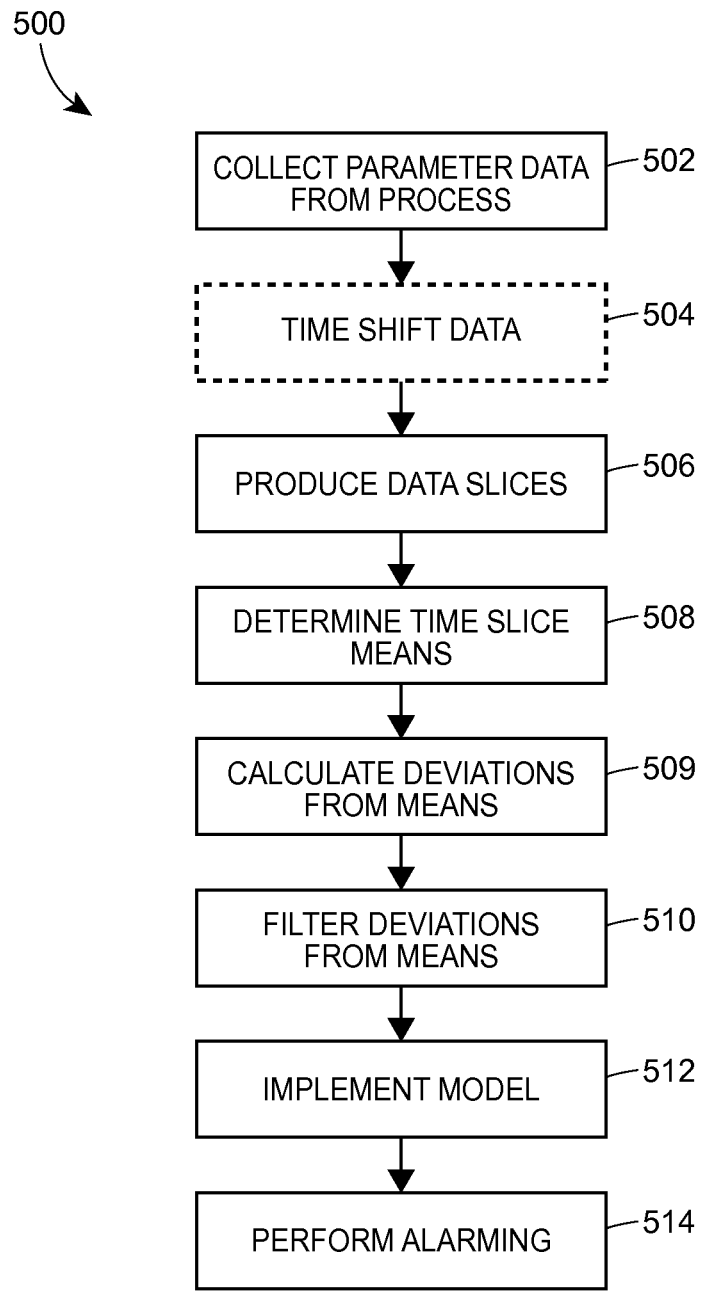
FIG. 7 is a flow chart of a process flow diagram illustrating a method of using one or more quality prediction models and fault detection models during on-line operation of a process to perform quality prediction and/or fault detection.

FIG. 7 depicts a flow chart illustrating a method 500 of using one of the quality prediction or fault detection models created using the method of FIG. 3 to perform on-line analysis of the operation of a process, such as the process 300 of FIGS. 6A and 6B. In particular, a block 502 collects and stores process parameter and state parameter data from the process. (Of course, quality parameter data and fault data may also be collected, but this action is not strictly necessary for performing data analytics of the process using the models created by the technique of FIG. 3). The collected process parameter and state parameter data could be obtained on-line from the process in real time, could be obtained via lab or off-line analyses, could be obtained via user input or could be obtained in any other desired manner.

Next, if the model being used is a quality prediction model, such as a PLS, NN or MLR model, a block 504 time shifts the process parameters and the state parameters, using the time shift amounts determined by the block 224 of FIG. 3. These time shift amounts may be stored as part of the model and may be obtained from the model if so desired. Thus, these time shift amounts are generally the same time shift amounts used to shift the data to produce the time aligned data slices used to produce the model. The block 504 is illustrated in dotted line because this block will not be performed if the model being used is a fault detection model, such as a PCA model.

In either case, a block 506 produces a set of data slices from the collected data and may store these data slices in memory, if so desired. If the model being used is a quality prediction model, these data slices are time shifted data slices because the process parameter and state parameter data within these data slices are shifted in time with respect to one another. However, if the model being used is a fault detection model, then the data slices are produced directly from the collected process data without being time shifted with respect to one another.

A block 508 next processes each of the data slices produced by the block 506 to determine a set of time slice means for each of the data slices. In particular, the block 508 uses the process state means stored as part of the model and the instantaneous value of the state parameter within a data slice to determine a set of time slice means for that data slice. When the state parameter is a continuous variable, the block 508 may determine an interpolation factor from the instantaneous value of the state parameter based on the distance between the instantaneous value of the state parameter and the two nearest process state means, and may then use this interpolation factor to interpolate between the process state means for the other process parameters (stored in the model) to determine time slice means for these other process parameters. If the state parameter is a discrete variable, the block 508 may simply determine the set of process state means to use based on the instantaneous value of the state parameter within the time slice. The block 508 may store the time slice means in a memory.

A block 509 then uses the time slice means and the instantaneous values of process parameter of the time slice to determine a set of deviations from the means for the data slice. In particular, the block 509 determines a difference between the instantaneous value of each of the process parameters of a time slice and its respective mean to produce a set of deviations from the mean for the time slice. Of course, the blocks 508 and 509 operate on each data slice to produce a continuous stream of deviations from the mean as the process that is being analyzed is operated on-line.

Next, a block 510 filters each stream of deviations from the mean (i.e., with one stream being created for each process parameter used as an input to the model) and provides the filtered deviations from the means to the model to be processed. The block 510 may use the same type of filtering technique used when creating the model and thus may use the same filter coefficients as used in the method of FIG. 3 to filter the deviations from the means used to produce the model in the first place. These filter coefficients may be stored as part of the model and thus may be obtained from the model itself.

A block 512 operates the model using the filtered deviations from the means to produce model outputs in the form of, for example, quality measurement predictions, fault detections, etc. A block 514 may operate on the output of the model to produce alarms or alerts to be displayed or otherwise provided to a user. In particular, the block 514 may compare the output of the model to one or more preset or pre-established thresholds to detect an output of the model that is above or below a threshold, and then set an alarm or an alert based on this comparison. Of course, other types of alarming may be performed on the output of the model as well or instead.

Figure 8:
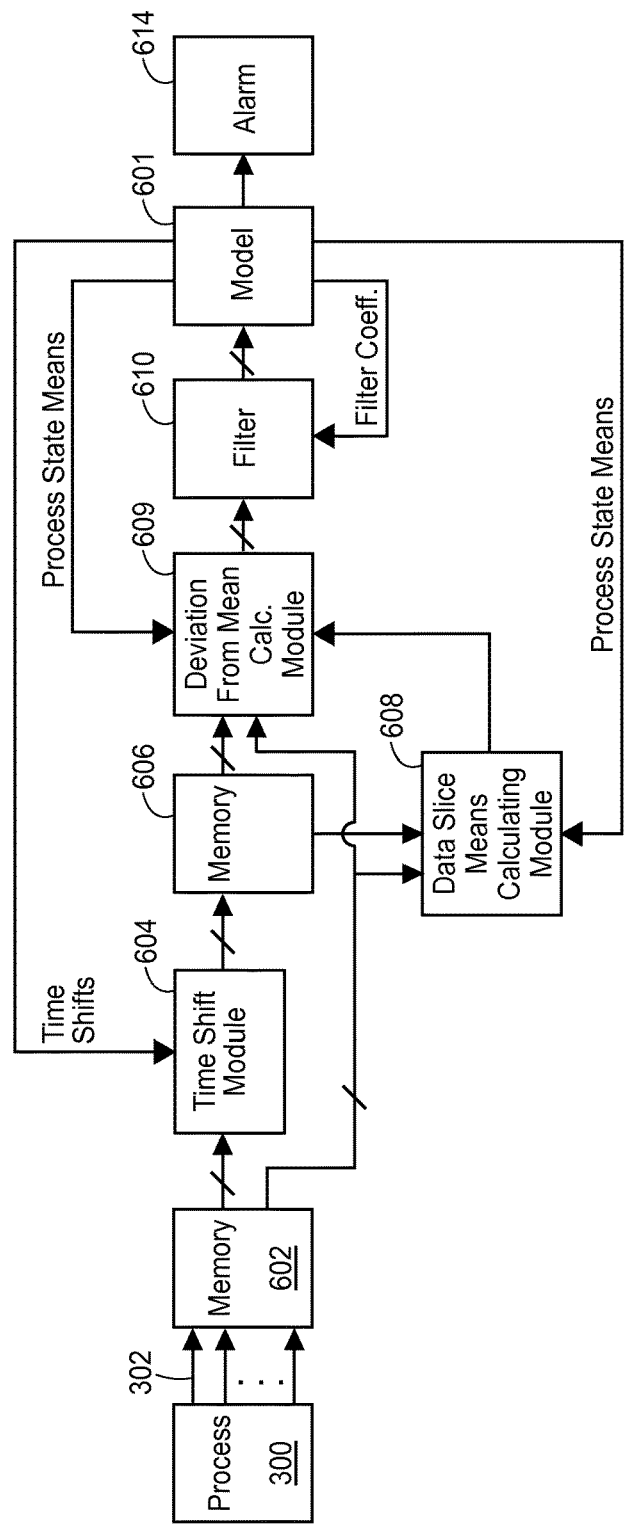
FIG. 8 is a hardware/software flow diagram illustrating a system of implementing one or more statistically based process models to perform process parameter quality prediction in a continuous or a batch process using process state data segregation.

FIG. 8 illustrates a system that may use the method of FIG. 7 to perform on-line data analytics for a process, such as the process 300 of FIGS. 6A and 6B, using a model 601 that was previously created for analyzing the process 300. In particular, as illustrated in FIG. 7, the process 300 operates to produce process parameter and state parameter data which is measured or collected in any desired manner and may be stored in a memory 602. In the case in which the quality prediction is being performed, a time shifting module 604 time shifts the process parameters and the state parameters, using the time shift amounts stored as part of the process model (as is indicated by the lines from the model 601 of FIG. 7). These time shift amounts are generally the same time shift amounts used to shift the data to produce the time aligned data slices used to produce the model. The time shifting module 604 may store the time shifted or time aligned data as time aligned data slices in a memory 606. If the model 601 is a fault detection model, then the time shifting module 604 is not needed or used.

In either case, a mean calculating module 608 processes each of the time aligned data slices stored in the memory 606 (in the case of a quality prediction system) or data slices collected from the process itself and stored in the memory 602 (in the case of a fault detection analytics system) to determine a set of time slice means for each of the data slices. In particular, the module 608 uses the process state means stored as part of the model 601 and the instantaneous value of the state parameter within a data slice to determine a set of time slice means for that data slice. When the state parameter is a continuous variable, the module 608 may determine an interpolation factor from the instantaneous value of the state parameter based on the distance between the instantaneous value of the state parameter and the two nearest process state means, and may then use this interpolation factor to interpolate between the process state means for the other process parameters (stored in the model 601) to determine time slice means for these other process parameters. If the state parameter is a discrete variable, the module 608 may simply determine the set of process state means to use based on the instantaneous value of the state parameter within the time slice. The module 608 may store the time slice means in a memory associated therewith.

A deviation module 609 then uses the time slice means and the instantaneous values of process parameter of the time slice to determine a set of deviations from the means for the data slice. In particular, the block 609 determines a difference between the instantaneous value of each of the process parameters of a time slice and their respective mean to produce a set of deviations from the mean for the time slice. Of course, the modules 608 and 609 operate on each data slice to produce a continuous stream of deviations from the mean as the process that is being analyzed is operated on-line.

Next, a filter module 610 filters each stream of deviations from the mean (i.e., with one stream being created for each process parameter used as an input to the model) and provides the filtered deviations from the means to the model to be processed. The filter 610 may use the same type of filtering technique used when creating the model 601 and thus may use the same filter coefficients as used in the method of FIG. 3 to filter the deviations from the means used to produce the model 601 in the first place. These filter coefficients may be stored as part of the model 601 and thus may be obtained from the model 601 itself.

The model 601 then operates or is implemented using the filtered deviations from the means and produces model outputs in the form of, for example, quality measurement predictions, fault detections, etc. An alarm module 614 may operate on the output of the model 601 to produce alarms or alerts to be displayed or otherwise provided to a user. In particular, the alarm module 614 may compare the output of the model 601 to one or more preset or pre-established thresholds to detect an output of the model 601 that is above or below a threshold, and then set an alarm or an alert based on this comparison. Of course, other types of alarming may be performed on the output of the model as well or instead.

Figure 9:
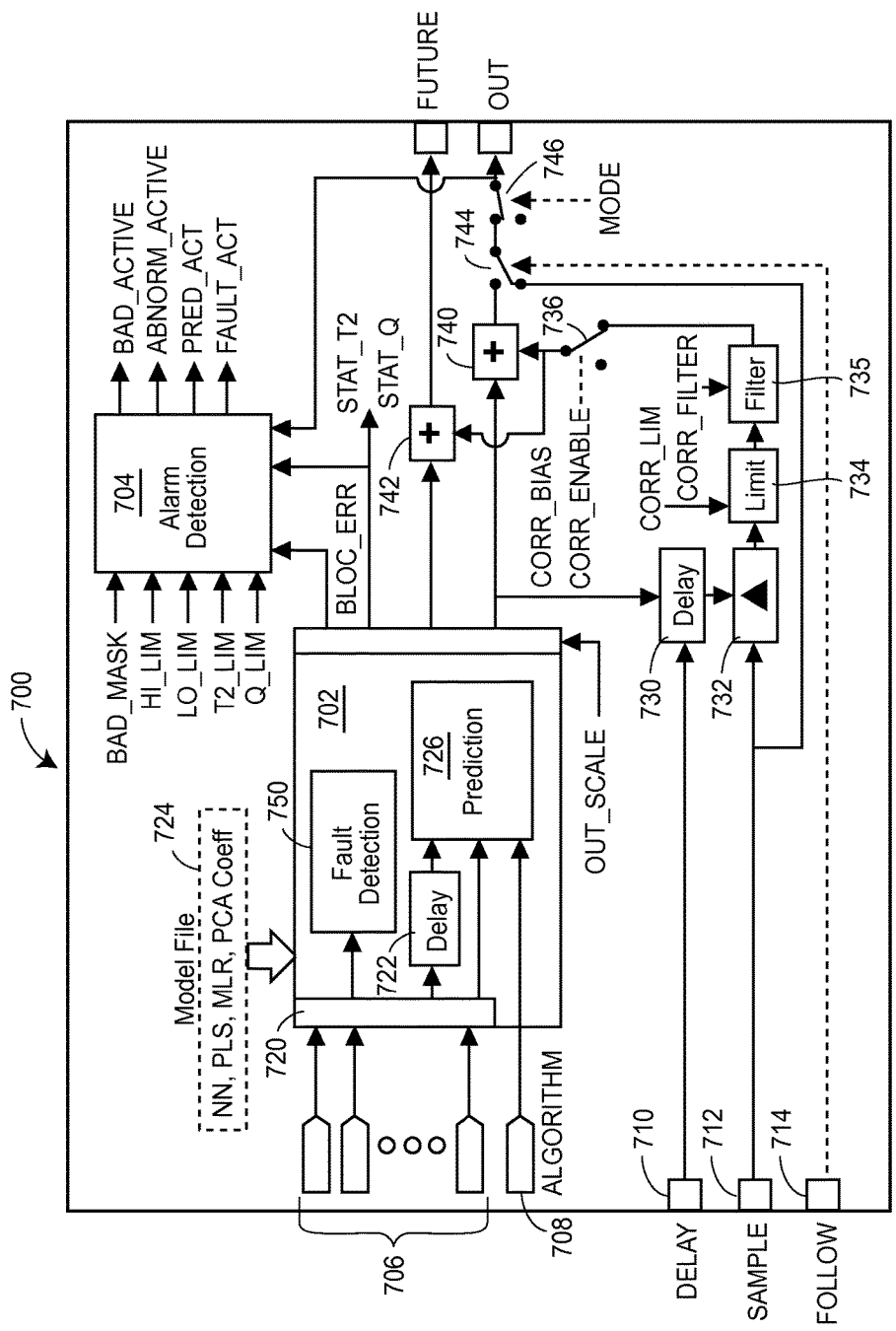
FIG. 9 is a block diagram of a function block that may be implemented to perform the quality prediction and/or fault detection using a statistical process model created using the method of FIG. 3.

FIG. 9 illustrates a block diagram of a function block 700 that may be implemented to perform the quality prediction and/or fault detection using a set of statistical process models created using the techniques described herein. If desired, the function block 700 may be executed or implemented in a user interface, in a process controller within a control system or even within a field device located in a process control system, such as in any of the process control systems of FIGS. 1 and 2. The function block 700, referred to herein as a data analytics (DA) function block, can be configured to be useable and viewable by a user in the same or similar manner as other function blocks within the process control system, to thereby make the DA function block 700 compatible and easily integrated into the process control system in which it is used to perform data analytics.

While the function block 700 is illustrated as performing both quality prediction and fault detection on the same set of process input parameters and state parameter, the function block 700 could instead perform one of quality prediction or fault detection and need not perform both. Additionally, while the function block 700 is described as performing a single type of quality prediction and fault detection based on a set of input parameters and a state parameter, the block 700 could include multiple sets of models and could perform multiple types of quality prediction and fault detection. However, for ease of use and configuration, it is preferable that a different function block 700 be created and implemented for each different type of quality prediction/fault detection desired to be performed.

The parameters of the DA function block 700 of FIG. 9 may include typical function block parameters and, in addition, may include a number new parameters and features described below. Generally speaking, the DA function block 700 includes a modeling block 702 and an alarming block 704, each of which includes a set of inputs and outputs. The inputs to the modeling block 702 includes a number of process parameter and state parameter inputs 706, an algorithm input 708, a delay input 710, a sample input 712 and a follow input 714. The process parameter and state parameter inputs 706 are communicatively connected to and receive, from other function blocks or devices within the process control system, the measured or otherwise determined values of the process parameters and the state parameter being used in the data analytics to perform quality prediction and fault detection. The algorithm input 708 is an enumerated parameter indicating the type of modeling algorithm used in the model. The algorithm input 708 input may specify, for example, that the function block 700 performs one of MLR, PLS, PLS-DA, and NN predictive modeling. The sample input 712 receives a determined quality sample that may be obtained from measurements, such as lab measurements, of the process and the delay input 710 receives a specified delay indicating the delay between the current time and the time for which the sample provided at the sample input 712 was obtained. The sample input 712 and the delay input 710 may be used to correct bias errors in the predictions being produced by the function block 700. The follow input 714 is an input that may be used to cause the output of the quality prediction routine of the function block 700 to simply follow the sample measurement provided at the sample input 712.

Generally speaking, the modeling block 702 includes an interface 720 that receives and stores the process parameter and state parameter inputs 706 and provides these inputs for performing quality prediction and fault detection. In particular, the interface 720 is connected to and provides process parameter values and state parameter values to a delay block 722 which delays the various inputs by the delay or time shift amounts provided with or determined for the quality model when it was created. These delays may be provided from a memory file 724 which stores the process parameter time shifts as well as the other model parameters including the model process state means, filtering coefficients, and model parameters or model coefficients use to implement the model.

A quality prediction modeling block 726 then uses the delayed or time aligned data slices produced by the delay block 722, the measured parameter values from the interface 720, the process state means, the filter coefficients, and the model coefficients (all from the model file 724) to perform quality prediction in the manner described above with respect to FIGS. 7 and 8. The quality prediction modeling block 726 may produce a future prediction (at a time horizon) which is provided to an output of the function block 700 labeled FUTURE and may produce a current prediction which is provide to an output of the function block 700 labeled as OUT. Of course, if desired, the quality prediction modeling block 726 may be programmed or designed to implement any of the different types of models as specified by the algorithm input 708, using model parameters or model coefficients stored in and provided by the model file 724.

However, bias correction or compensation may be performed on both of the prediction values provided to the FUTURE and OUT outputs of the function block 700. In particular, a delay unit 730 delays the predicted quality output by the delay amount specified at the delay input 710 and a summing block 732 determines a difference between the delayed predicted current output of the quality prediction modeling block 726 and the sample measurement provided at the sample input 712. A limit block 734 limits this difference using a correction limit input (which may be specified by a user or function block designer for example) and a filter 735 then filters the output of the limit block 732 using a correction filter coefficient or parameter (which may also be specified or provided by a user or function block designer for example). The output of the filter 735 is a bias correction which is provided to a bias enable switch 736 which may be turned on and off by a user or other automatic input generated in the process control system. If the bias enable switch 736 is on or enabled, summer blocks 740 and 742 add the bias correction to the current prediction and the future prediction values produced by the quality prediction modeling block 726.

A switch 744, which is operated or controlled by the follow input 714, switches between connecting the bias corrected current output of the block 726 or the sample value provided at the sample input 712 to the OUT output of the function block 700. The follow input 714 thus causes the OUT output of the function block 700 to follow the sample value being provided at the sample input 712. Moreover, a mode switch 746, which is controlled by a mode signal, controls whether any output is provided at the OUT output of the function block 700. The mode switch 746 may be used to disable the current quality output prediction of the function block 700 based on the mode of the function block 700 or some other function block that might be using the output of the function block 700. Thus, the mode switch 746 enables the output of the function block 700 to be disabled or disconnected when the portion of the process control system pertaining to or being modeled by the function block 700 is, for example, in an out of service mode, an abnormal mode, a manual mode, etc.

Still further, a fault detection block 750 is connected to the interface 702 and receives the process parameter and state parameter inputs and uses these, as well as the state means and other model information from the model file 724 to perform fault detection in the manner described above with respect to FIGS. 7 and 8. The output of the block 750 includes a Block error output, a Stat_T2 output and a Stat_Q output. The Block error output is the error or fault detection output being modeled or determined by the fault detection block 750 and is a typical PCA model output when used for fault detection. The Stat-T2 parameter is a read-only, floating point number showing the $T^2$ statistic of the PCA model used in fault detection. The Stat_Q is a read-only, floating point number showing the Q statistic of the PCA model used in fault detection. The Stat_T2 output and Stat_Q statistics are typically produced by predictive models such as PCA models and are commonly used for predictive alarming. Of course, if desired, the fault detection modeling block 750 may be programmed or designed to implement any of the different types of models using model parameters or model coefficients stored in and provided by the model file 724.

In any event, as illustrated in FIG. 9, the Block error, the Stat_T2 and the Q statistics are provided to the alarming block 704 along with the current quality prediction value (which may have bias correction applied thereto). The alarming block 704 also receives as input parameters, a T2_LIM, which is an upper alarm limit for the calculated $T^2$ statistic of the fault detection block 750, a Q_LIM, which is an upper alarm limit for the calculated Q statistic, a LO_LIM, which specifies the low alarm limit on the quality prediction (which may be set to the product specification low limit if desired) and a HI_LIM, which specifies the high alarm limit on the quality prediction (and which may be set to the product specification high limit).

Still further, a PRED_ACT output of the alarming block 704 is used to trigger the alarming on quality prediction and a FAULT_ACT output of the alarming block 704 is used to trigger the alarming on fault detection. Of course, the alarming block 704 may determine alarm trigging by comparing the quality prediction values provided thereto by the quality prediction modeling block 726 to the LO-LIM and the HI_LIM values to determine if the quality prediction value exceeds (is lower than or higher then, respectively) these limits and may trigger an alarm at the PRED_ACT output if so. Likewise, the alarming block 704 may determine alarm triggering by comparing the various outputs, Block error, Stat_T2 and Stat_Q, of the fault detection modeling block 750 to a fault threshold, the T2_Lim and the Q_Lim, respectively, to determine if any of the fault detection values meets or exceeds it limit (or the Block error value indicates a fault). If a threshold is met or exceeded, the alarming block 704 may trigger an alarm at the FAULT_ACT output. Any or all of the outputs of the alarming block and the predication blocks 726 and 750 may be provided to and stored in a data historian if so desired, for easy retrieval.

Additionally, if desired, adaptive modeling may be implemented on-line when using the quality prediction and fault detection models constructed or generated with the modeling techniques described herein. In particular, there may be circumstances in which the modeling system, once created, operates to analyze process conditions that differ significantly from the process conditions experienced during the time that the process training data used for creating the models in the data analytics system was collected. For example, the process may undergo or experience a different throughput, or the process may be used to produce a new product grade, and thus operate in conditions that were not experienced during the training phase. In one example, the process may not have experienced or operated in one or more of the process states that were defined for the process during the step of collecting training data. In another example, the process states for the process may have been defined based on the range of the state parameter during the training runs, but the process may enter a new and previously undefined process state as determined by the state parameter. In other situations, it may be determined that the operation of the process has changed somewhat due to different ambient conditions, aging of process equipment or a change in some other disturbance variable (measured or unmeasured) from when the training data was collected. In these cases, model adjustment may be required to improve the operation of the data analytics system. Adaptive modeling, as described below, may be used to compensate for these situations without needing to regenerate the underlying models themselves.

In particular, it is possible to perform adaptive modeling in the systems described herein in response to these or other conditions or situations, without changing the underlying process model(s) developed during the model generation phases. In particular, model adjustment may be made by determining a new set of process state means for each of the process states (either originally defined process state or newly added process states) from newly collected process measurements, and then storing these new process state means as part of the model, for the process states for which model adjustment is performed. If desired, standard deviations may also be calculated and stored for each of the adapted process states.

Thus, generally speaking, model adaptation may be performed by performing adaptation of the mean values (the process state means) stored in the model for each process state. Without model adaptation, it is necessary to collect data that covers the entire operating range of the process states during model development. Based on the variation seen in the data for each measurement, the operating range can be divided into a selectable number of states (e.g., five). However, with model adaptation, the process data used in the training phase does not have to cover the full operating range of the process because, as the process moves into a different process state, the modeling system can collect process data for each of the state parameter and process parameters for a period of time while the process is in that new or changed process state, and thereafter the modeling system can automatically calculate the mean value for each of the process parameters and the state parameter while the process is in that new or changed process state. These means values can be saved in the model (to thereby adapt the model) for use in modeling the process while the process operates in that process state in the future.

For example, if the flow rate that dictates the process throughput is selected as the state parameter, data for the process parameter measurements could be initially collected and used in model development even though the state parameter only varied over a small operating region of flow rate. For this case, the user would identify the range over which the state parameter normally operates. Here, while processing the data during the model build, the data that was collected may only fall into a few of the possible states (based on the user input of the state range). For the process states for which process parameter data is collected, the model generation routine calculates a set of means. However, for the process states in which no process parameter data was collected during the model generation phase, the parameter mean values could be initially set to some arbitrary value, e.g., equal to the parameter mean values for the nearest state for which data was collected. After putting the model on-line within a modeling system, when the state parameter value changes to indicate a process state for which no data was previously collected, then the modeling or data analytics system could perform adaptive modeling by entering into an adaptation phase.

In particular, during an adaptation phase, the process parameter data and state parameter data is collected on-line as the process operates in the new process state. After some time, or after each new time sample, the mean values for this process state will be updated based on the values of the process parameter and state parameter data measured while the process is operating in the new process state. For each process state, a user could specify if adaptation of the means is allowed. This capability could also be used to update the model (to account for process changes) if the user indicates that adaptation is allowed. To prevent the mean values from adapting to incorrect values if the process is shut down, the user could have the capability to see or view the calculated mean values on a process state by process state basis, and to limit how much (e.g., a percent change allowed) the adaptation of the mean could cause a change from the value approved by the user and/or identified during model development.

If desired, on-line model adaptation may be performed in a scheduled manner or an unscheduled manner. For example, when product grade or process rate changes require new settings for some or most of the process parameters, the model parameters can be adjusted in a scheduled manner, i.e., all at once, if process state and parameter settings for a new grade (mean values and standard deviations) are known. However, if the mean values and the process state values for one or more new states are not known, these values can be adapted gradually to implement new parameter mean values.

In one example, scheduled model changes can be based on prior knowledge of the process states for new product grades which knowledge can be obtained via measurements made on-line and stored until the scheduled model adaptation process is performed. A procedure for developing a model suitable for use in applying scheduled changes or scheduled adaptation may first include a grade or process state identification parameter into historical data collection and store data for that new grade or process state as data becomes available. The procedure may then preprocess the training data with the newly collected data, accounting for all of the grades. In doing so, the procedure calculates mean values and standard deviations for every grade separately. The procedure may then normalize the data separately for every grade using the specific grades mean values and standard deviations for these grades. The modeling technique then develops one model using data from multiple grades. Because data is conditioned by mean values and standard deviations for specific grades, conditioned/normalized data can be used for a common multi-grade model development. Next, the method may store the mean values and standard deviations for every grade used for model development as part of the multi-grade model.

However, performing unscheduled model adaptation operates to calculate on-line mean values and standard deviations at the changed or new state and applies theses new mean values and standard deviations to the model individually as these new values are determined. Unscheduled model adaptation is used when a new state was not originally included in the model (e.g., there was no historical or training data for this specific process state). A process state change could be detected automatically and the detection may trigger the adaptive modeling technique to perform a model mean values and standard deviations change. If new state parameters are not present in the model, the adaptive adaptation routine adjusts the model based on the current on-line data collection and model parameters calculation. Actual process parameter means and state parameter means to be used as process state means for the new process state are applied to the model with some delay after process state change as it takes some time to collect enough data from the operation of the process on-line to determined a statistically valuable means for each of the process parameters and the state parameter in the new process state. The delay is defined by the successive calculations and adjustment time.

If desired, the new model parameter mean values will have a bias relative to the original model parameter mean values. That is, a model mean value bias $\beta$ can be applied as a filtering value for determining the adapted mean as:

$$\Delta x_{mean}^{mod}(k)=\beta \Delta x_{mean}^{raw}(k)+(1-\beta)\Delta x_{mean}^{mod}(k-1)$$

Here, the raw mean is the recently calculated bias defined during the on-line operation. For a process state shift due to changed conditions (which may be caused because process equipment may degrade or other conditions may change in a predicted or unpredicted way), the same mean bias parameter may be use to filter the adapted means as described above. Moreover, for other changes or disturbances, some mean value changes may be constant and/or may be difficult to track in a practical way. In these cases, it may be desirable to increase the robustness or sensitivity of the model to minimize false alarming.

While the data analytics techniques discussed above have been described for continuous analytics (i.e., for performing analytics in continuous processes), these techniques could also be applied to simple batch process applications where the "time in batch" or some other parameter that indicates progression of the batch processing is used as the state parameter. In this case, "simple batch" process are those in which 1) batch processing is confined to one process unit, 2) the inputs/outputs of the batch process do not change as the batch progresses and 3) the same product is always manufactured in the process unit.

Additionally, it is desirable to enable a user to more easily view and obtain information pertaining to an alarm or an alert that is generated on a quality prediction or a fault detection, such as an alarm or an alert generated by the data analytics function block 700 of FIG. 9. In particular, it is desirable to add an alert tab to a user interface screen which, when selected, shows the quality or fault alerts that have been reported by the continuous data analytics system. In this system, the user is then able to select an alert or an alarm from this list and, in response to this selection, the user is automatically provided with the associated history information of the alert or the alarm, such as the values of prediction or the $T^2$ or Q statistics that lead up to the alert, the parameter values of the relevant parameters both before and after the alert was issued, etc. This feature provides significant time savings for the user in that, rather than the user having to find and scroll back through a trend plot of predicted quality or fault statics ($T^2$ or Q, prediction values, etc.) to find a fault or poor prediction, the new user interface enables the user to see all of the alerts that have been generated, and to immediately see the historic data associated with a selected alert (without scrolling through a trend display of different process parameters).

This user interface may be used in a broader context in any process control system interfaces that provide alarm summary displays that a user can access to view detected process alarms, as this user interface system enables a user to easily view historic data associated with different parameters relevant to any types of alarms that have been generated. In particular, this user interface can be used in any context in which a process alarm or alert is generated and is provided to a user via a user interface screen or display, and the new user interface allows the user to quickly analyze the conditions that led up to an alarm or an alert because the system allows the user to see historic process parameter trend data (as stored in a data historian) immediately before and after an alert was generated without the user needing to go to an historian interface, call up the parameter associated with the event and then scroll back in time to see the trend data immediately before and after the alert was generated.

Figure 10:
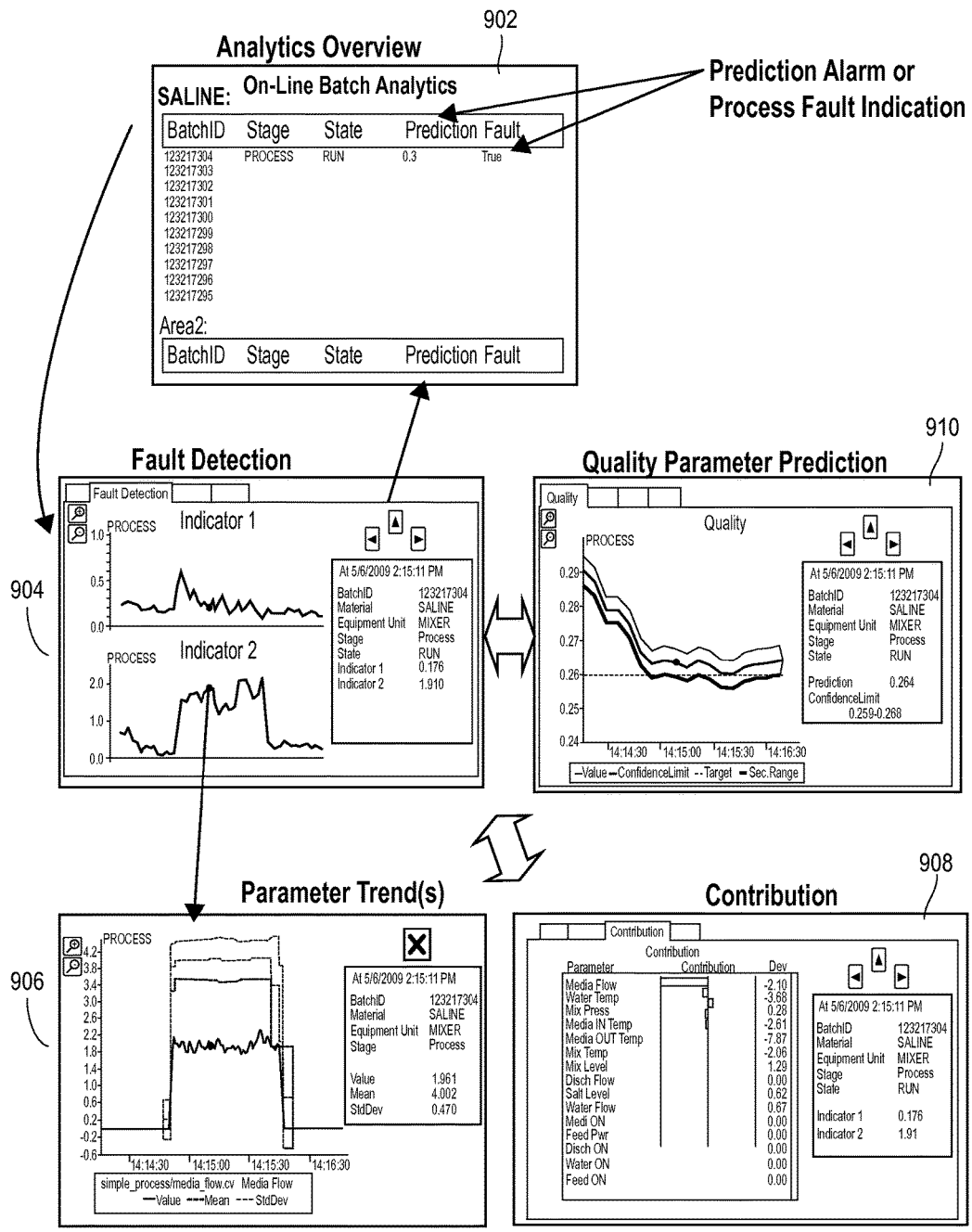
FIG. 10 illustrates a series of user interface screens that are traditionally provided to users to enable users to perform analysis of parameter data associated with an alarm or an alert.

As a way of comparison, the manner in which alerts are currently displayed and analyzed in some traditional user interface used in batch process control systems is illustrated in FIG. 10. At a top level, a list of active processes, such as batch processes and a list of completed batches is illustrated. If an alert is active in one of the processes, this alert is indicated in the overview (see screen 902). The user may then select a batch process from this overview and then (by default) the user interface changes to show a historic trend of the two statistics (the $T^2$ and Q statistics of a PCA model) that are used for fault detection (see screen 904). If either statistic exceeds a value of one (1) then this is considered to be a fault condition. To examine the process measurements that are associated with a fault, it is necessary for the user to examine the historic trend of the two statistical parameters, find a time when the statistics exceeded a value of one, and then select that point in time on the displayed trend. In response, the user is then shown the measurements that most contributed to the fault (see screens 906 and 908).

Similarly, when a quality prediction alarm is indicated in the overview, the user is provided with the ability to select the process and to then select the quality prediction tab. In response, the user interface system displays a historic trend of the quality parameter (see screen 910). The user interface then allows the user to examine the quality parameter trend to determine when the prediction exceeded a product specification limit. To explore the cause of a deviation in quality prediction above or below a specification limit, the user must then select this point in time within the trend plot, select the fault detection tab and examine the historic trend to see if a fault was detected at the time of the quality parameter alarm.

There are significant limitations and disadvantages of this traditional approach in exploring an alert condition. In particular, in the overview, the user only knows that an alert is currently active and to find more information about past alerts, it is necessary for the user to 1) select a historic trend of the statistics used in process fault detection or of the predicted quality parameter, 2) examine the trend to determine when the alert(s) occurred and then 3) select the point in the trend where the alert occurred to find more information about the alert condition. Moreover, to find all of the alerts that have occurred in the past, it would be necessary to find and select each alert within statistical parameters trend plots or the predicted quality trend plots, which is time consuming and tedious. In fact, it is time consuming to scroll back in the trend history to find when an alert condition was active for either a continuous process or a batch process. As a result, it may not be possible to easily analyze all past alerts to find common problems, etc. Also, alerts that indicate conditions that contributed to the production of off-specification products may be easily overlooked.

The new user interface described herein, however, enables a user to examine alerts that are currently active or that have occurred in the past. For the continuous data analytics application, alerts may be triggered by the predicted product quality exceeding user defined or calculated limits (such as product specification or confidence limits) or by process faults that have been detected (utilizing a PCA model and its associated statistics).

More particularly, with the new user interface, a continuous list tab is provided in a user interface screen and, when this tab is selected, an overview is provided of the continuous data analytics blocks (CDA blocks such as that of FIG. 9) that are currently installed in the control system for quality prediction and/or fault detection. In this overview, the last quality prediction or process fault is shown for each CDA block, as illustrated in FIG. 11A.

Figure 11B:
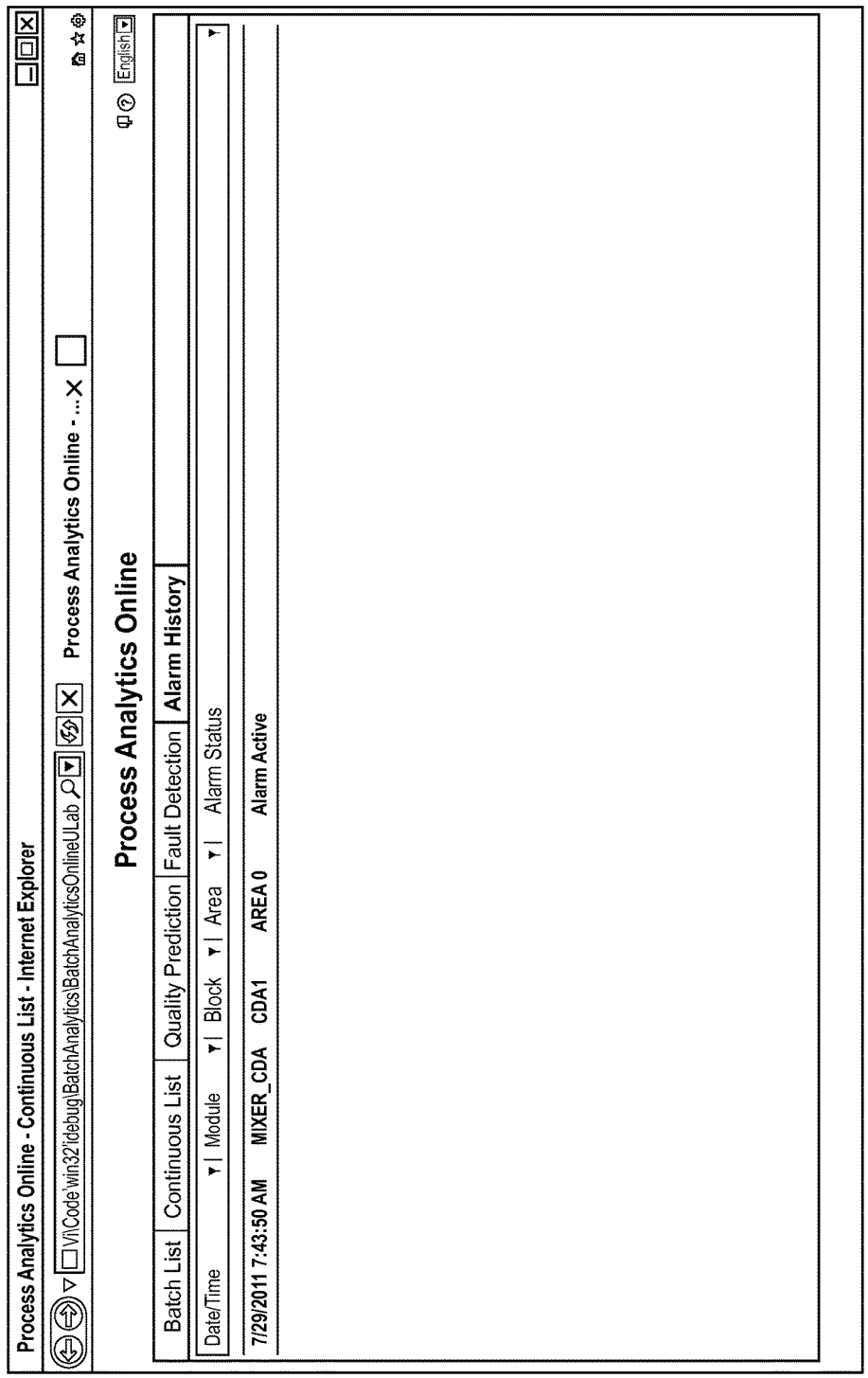

Significantly, an alarm history tab has been added to the user interface screen to enable a user to view all of the data analytic alerts that have been detected. When a user selects this tab, the user interface displays a list of current and past alerts. The example user interface screen of FIG. 11B shows an alarm history view where only one (1) alert has occurred in the past. In general this view would contain many process faults and quality parameter prediction alarms.

Figure 11C:
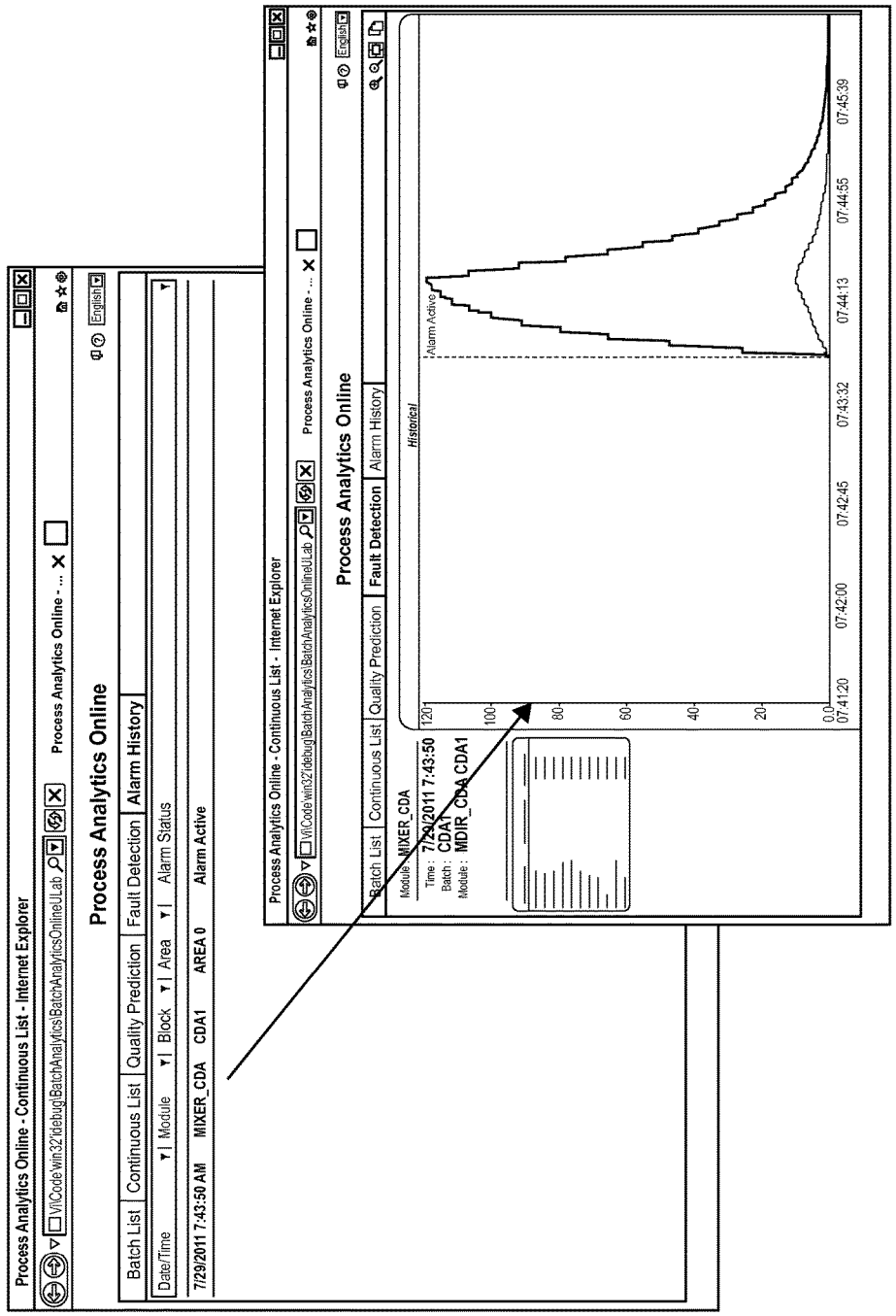

When a user selects one of the alerts in the summary list, the user interface changes the display to show the associated quality parameter prediction or process fault detection trend centered about the time of the alert. An example of the view provided for a process faults is illustrated in FIG. 11C.

Figure 11D:
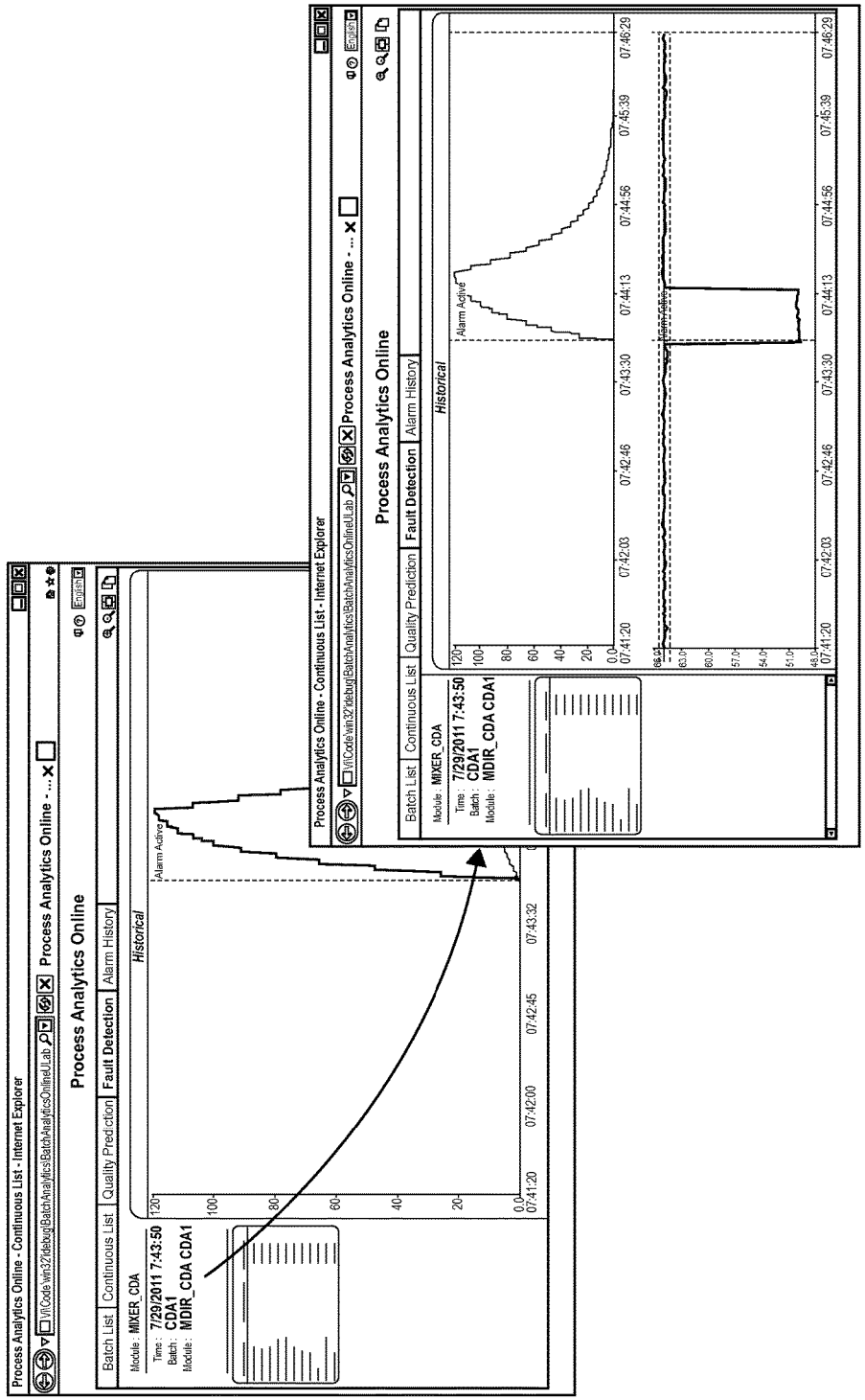

Next, when a user selects one of the parameters that contributed to the fault, the user interface provides historic information for this parameter (e.g., a parameter trend plot) using parameter data at the time of the fault. This operation is illustrated in the screen image of FIG. 11D. Of course, the user interface system may access this data from the data historian for the time period associated with the alert (e.g., when the alert was generated).

This ability to easily view all of the alerts that have occurred in the past and to easily access associated historic information at the time of the alert has many advantages over the traditional alarm summary interface, which does not provide an alert summary and provides no support to display associated historic information at the time of the alert.

Figure 12A:
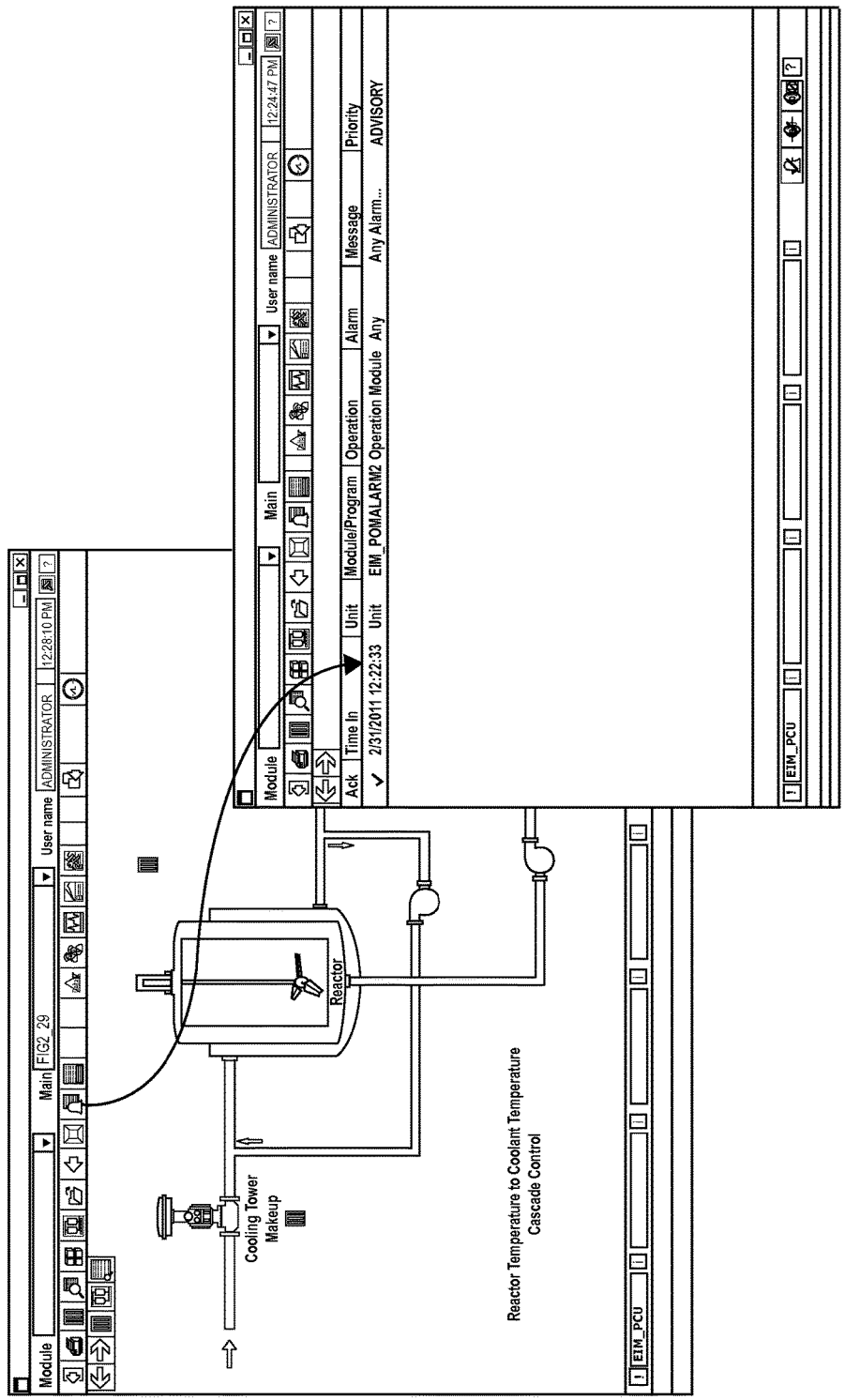
FIGS. 12-12C illustrate a series of user interface screens that may be created and provided to a user to allow a user to easily view process parameter trend plots related to an alarm or an alert generated in a traditional process control system alarming context.

Moreover, there are other applications for the alert interface illustrated in FIGS. 11A-11D outside of the use with the data analytic blocks described herein. In fact, the concepts associated with the alert interface described as being implemented in continuous data analytics can be applied to many other applications. As an example, an "alarm list" button is provided in the standard DeltaV™ operator interface. When the operator makes this selection, a list of current active alarms is displayed, as illustrated in FIG. 12A.

Figure 12B:
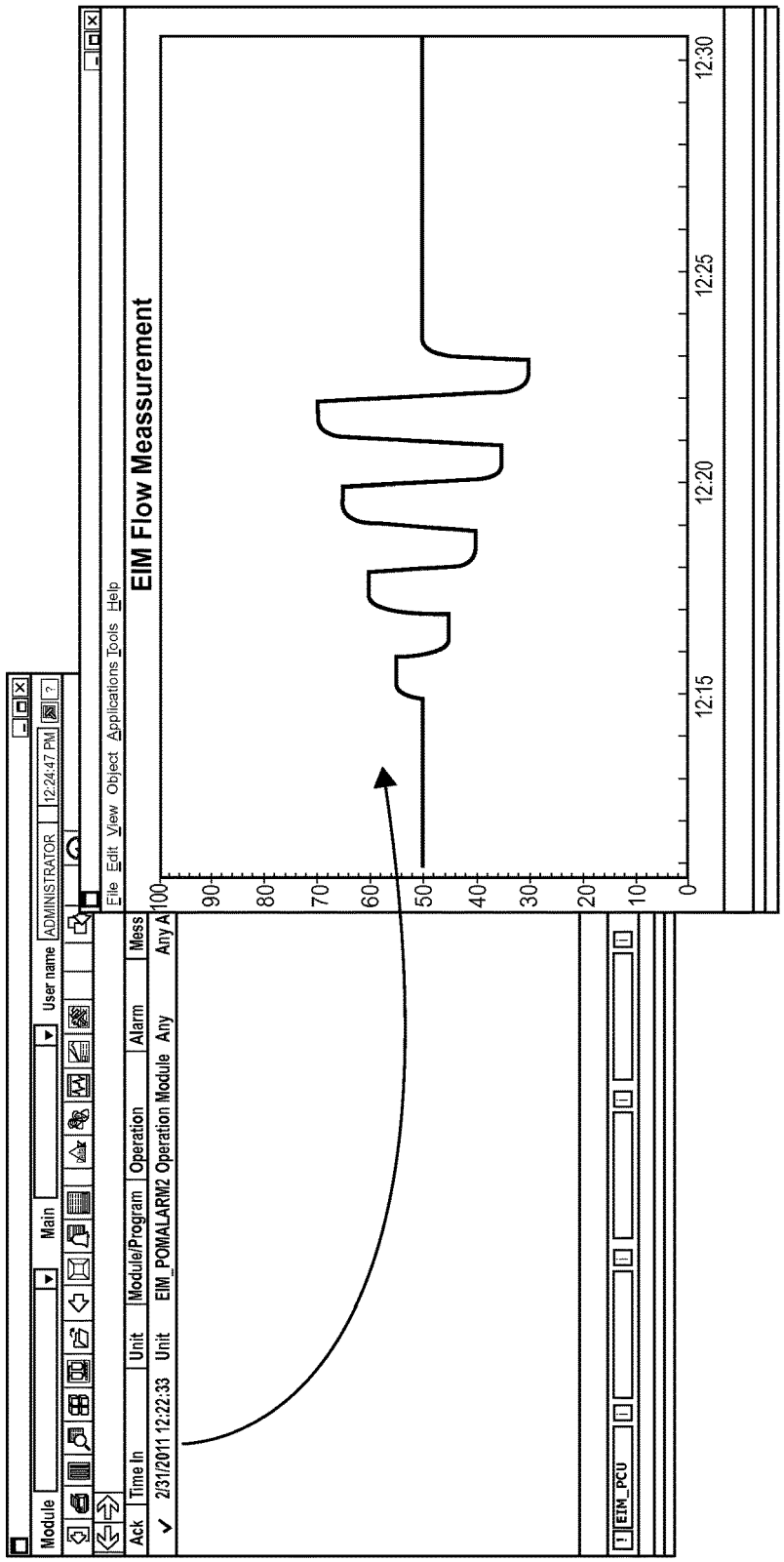

When viewing the alarm list, no support is provided for the user to easily access and examine values of the process parameter(s) in the alarm around the time that the alarm was detected. However, using the use interface described herein, the alarm list display is modified to support the display of associated historic information at the time of an alarm selected in this list, which makes it much easier and faster for a user to analyze the source of the alarm. This concept is illustrated in FIG. 12B where a user can see an alarm list and select an alarm to see trend data for the alarm variable (i.e., the variable that was used to generate the alarm).

Figure 12C:
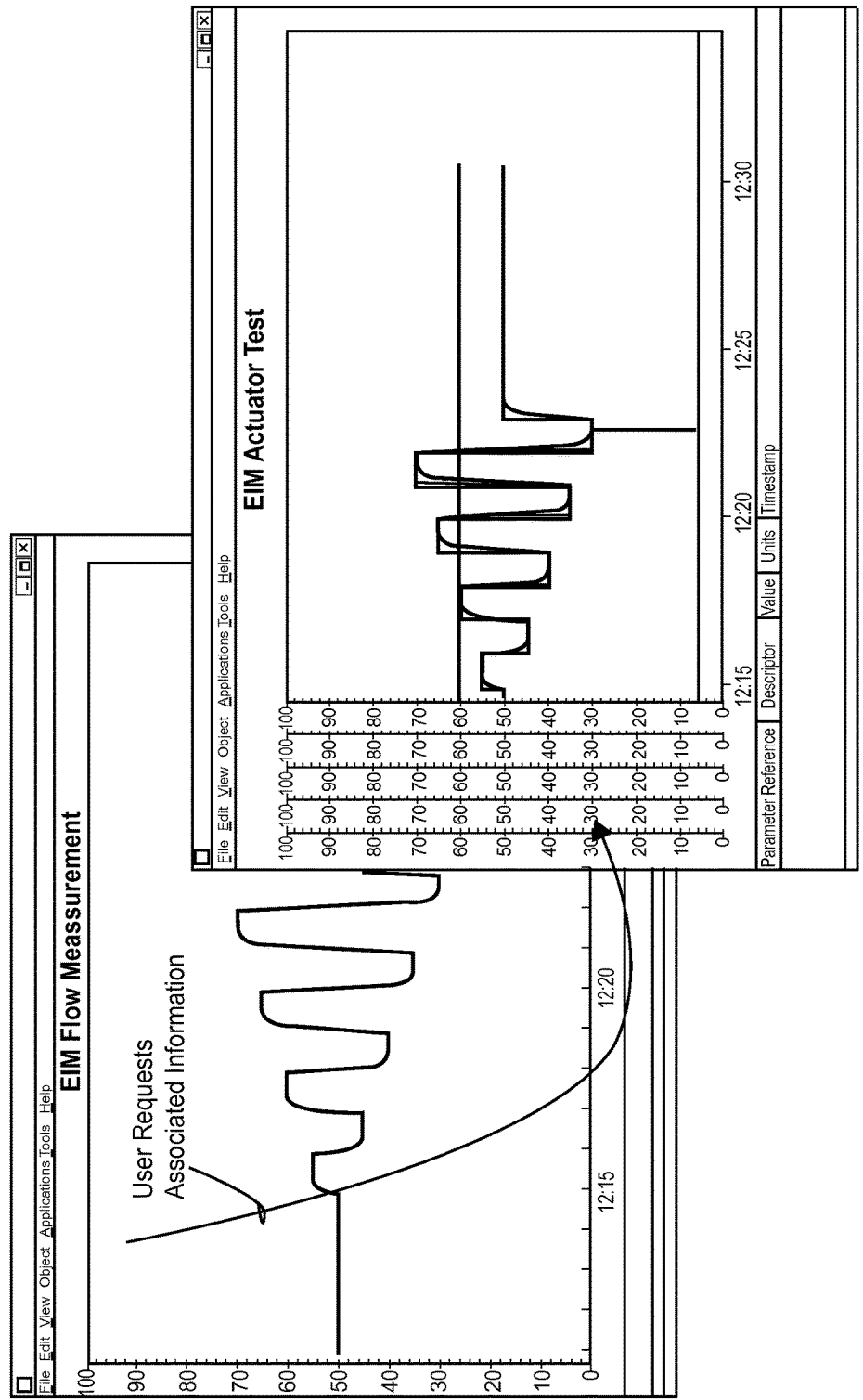

Additionally, if the measurements in the alarm are associated with other parameters, the user interface can provide the user with the option to request that the historian values of associated parameters around the time of the alarm also be displayed. For example if the parameter in alarm is the PV of a PID block or is an input of an MPC block, etc., then any other parameter(s) of the block that is assigned to the historian could be displayed around the time of the alarm. Such a display is illustrated in FIG. 12C. By allowing associated historic information at the time of the alarm to be easy accessed and displayed, it is easier and quicker for the operator to analyze the source of the problem.

As noted above, at least some of the above described example methods and/or apparatus may be implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or systems described herein.

It should also be noted that the example software and/or firmware implementations described herein are stored on a tangible storage medium, such as a magnetic medium (e.g., a magnetic disk or tape), a magneto-optical or optical medium such as an optical disk, or a solid state medium such as a memory card or other package that houses one or more read-only (non-volatile) memories, random access memories, or other re-writable (volatile) memories. Accordingly, the example software and/or firmware described herein can be stored on a tangible storage medium such as those described above or successor storage media. To the extent the above specification describes example components and functions with reference to particular standards and protocols, it is understood that the scope of this patent is not limited to such standards and protocols. For instance, each of the standards for internet and other packet-switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example methods and apparatus including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification describes example methods, systems, and/or machine-accessible medium, the examples are not the only way to implement such systems, methods and machine-accessible medium. Therefore, although certain example methods, systems, and machine-accessible medium have been described herein, the scope of coverage of this patent is not limited thereto.

The invention claimed is:

1. A computer implemented method of adapting an operations management system (OMS) device of a process plant with a process model, the process model configured to analyze the operation of an on-line process operating within a process control network of the process plant, and the process model, configured to operate in a number of different process states of the on-line process as defined by a state variable associated with the on-line process, the method comprising:

collecting, via the process control network, training data of the on-line process during operation of the on-line process in the process plant, the training data including a value for each of a set of process parameters, a value for the state variable and a value of a result variable associated with each of a multiplicity of different process measurement times of the on-line process;

dividing, with one or more processors of the process control network, the training data into time slices of data to produce a set of time sliced data for each time slice of data, wherein each set of time sliced data includes a value for each of the set of process parameters, a value for the state variable and a value for the result variable;

storing the sets of time sliced data in a computer memory of the process control network;

determining, with the one or more processors of the process control network, a set of process state means from the training data, the set of process state means including a state variable mean for each of the process states and one or more process parameter means for each of the process states;

storing the set of process state means in a computer memory of the process control network;

developing, using a computer processing device, a set of time slice means for each of the time slices of data using the stored process state means, each of the sets of time slice means including a time slice mean for each of the process parameters;

developing, with the one or more processors of the process control network, a set of deviations from the mean for each time slice of data, the set of deviations from the mean for a particular time slice of data including, for each process parameter within the particular time slice of data, using the process parameter value of the particular time slice of data and the time slice mean for the process parameter for the particular time slice of data to develop the deviation from the mean for the process parameter for the particular time slice of data; and generating, with the one or more processors of the process control network, a process model using the sets of deviations from the mean for the time slices of data and the result variable values for the time slices of data, wherein the process model is generated as a quality prediction model or a fault detection model; and adapting, with the one or more processors of the process control network, the OMS device of the process plant with the quality prediction model or the fault detection model, wherein the quality prediction model or the fault detection model is operable to perform quality prediction or fault detection across the number of different process states of the on-line process.

2. The computer implemented method of claim 1, wherein generating the process model includes generating a quality prediction model as one of a partial least squares model, a neural network model, or a multiple linear regression model.

3. The computer implemented method of claim 1, wherein generating the process model includes generating a fault detection model as a principle component analysis model.

4. The computer implemented method of claim 1, further including storing the determined process state means for the process states as part of the generated process model, collecting new process parameter values and state variable values from the operating process, and using the collected new process parameter values and the state variable values and the process state means to develop inputs to the generated process model to develop an estimate of the result variable, and further including using the collected new process parameter values and the state variable values of the operating process to determine deviations from the means for a set of time slices based on the process state means stored as part of the process model.

5. A computer implemented method of adapting a computing device of a process control network of a process plant with a process prediction model, the method comprising:

collecting, via the process control network, process parameter values for a set of process parameters, state variable values for a state variable and result variable values for a result variable from an on-line process for each of a number of process times of the on-line process, the on-line process operating within the process control network of the process plant;

determining, with the computing device of the process control network, a set of process state means, wherein the set of process state means includes, for each of multiple process states of the on-line operating process, a mean value of the state variable and a mean value of each of the process parameters when the online process is operating in each of the multiple process states;

determining, with the computing device of the process control network, for each of multiple sets of time-related data, a time slice mean for each of the set of process parameters using the process state means and a value of the state variable associated with each of multiple sets of time-related data;

determining, with the computing device of the process control network, a deviation from the mean for each of the process parameters for each of the multiple sets of time-related data using the time slice means and the process parameter values of each of the multiple sets of time-related data, and using, with the computing device of the process control network, the determined deviation from the mean for each of the process parameters for each of the multiple sets of time-related data and the result variable values of each of the multiple sets of time-related data to generate a process prediction model capable of operating on a computer processing device to predict a result variable within the online process, adapting the computing device of the process control network with the process prediction model, wherein the computing device of the process control network, via the process prediction model, applies sets of deviations from the mean of the process parameters to predict a value of the result variable of the online process.

6. The computer implemented method of claim 5, wherein generating a process prediction model includes generating one of a partial least squares model, a neural network model, a multiple linear regression model or a principle component analysis model.

7. A computer implemented method of adapting a computing device of a process control network of a process plant to alter process quality or a process fault during an on-line operating process of the process control network, the method comprising:

adapting the computing device of the of the process control network of the process plant with a process prediction model stored in a computer memory of the computing device of the of the process control network of the process plant, wherein the process prediction model of the computing device takes, as a set of inputs, a set of deviations from means for each of a set of process parameters and produces, as an output, a predicted process quality value or a process fault value;

collecting process parameter data for each of the set of process parameters and process state variable data for a process state variable from the on-line operating process during online operation of the online operating process for a multiplicity of measurement times of the on-line operating process;

developing, with the computing device of the process control network, a series of time slices of data, each time slice of data including a process parameter value for each of the set of process parameters and a process state variable value;

determining, with the computing device of the process control network, a deviation from a mean for each of the process parameters for each of the time slices of data;

providing, with the computing device of the process control network, the determined deviations from the means for each of the time slices of data as inputs to the process prediction model while executing the process prediction model on the computing device of the process control network to produce a prediction of the process quality value or the process fault value, and altering, with the computing device of the process control network, the operation of the online operating process using the prediction of the process quality value or the process fault value.

8. The computer implemented method of claim 7, further including using the prediction of the process quality value or the process fault value to notify a user of a process operational issue.

9. The computer implemented method of claim 7, wherein determining the deviations from the means for each of the time slices of data includes comparing a process parameter value of a process parameter to a time slice mean for the process parameter.

10. The computer implemented method of claim 7, wherein the process state means includes a process parameter mean for each process parameter and a state variable mean for the state variable for each of a plurality of process states.

11. The computer implemented method of claim 7, further including filtering the determined deviations from the means prior to using the deviations from the means as inputs to the process prediction model.

12. A process model development system for use in modeling the operation of an online process operating within a process control network of a process plant, the system comprising:
   a computer readable memory;
   a data collection unit that stores, in the computer-readable memory, a process parameter value for each of a plurality of process parameters determined from the online process operating within the process control network of the process plant, a state variable value for a state variable determined from the process and a result variable value for a result variable determined from the online process for each of a number of different process operational times of the on-line process;
   a time slice determination unit that determines a series of time slices of data from the data stored by the data collection unit, wherein each time slice of data includes a process parameter value for each of the plurality of process parameters, a state variable value for the state variable and a result variable value for the result variable;
   a process state mean calculation unit that determines a set of process state means for each of a multiplicity of process states, wherein the set of process state means for a particular process state includes a mean of the state variable value from each of the time slices of data in which the state variable value is in a range associated with the particular process state, and a mean value of each of the process parameter values from each of the time slices of data in which the state variable value is in a range associated with the particular process state;
   a time slice mean calculation unit that calculates a time slice mean value for each of the process parameters for each of the time slices of data;
   a deviation calculation unit that calculates a deviation from the time slice mean value for each of the process parameters for each of the time slices of data, wherein the deviation calculation unit calculates a deviation from the time slice mean for a particular process parameter by calculating a difference between the particular process parameter value of the time slice of data and the time slice mean of the time slice of data for the particular process parameter; and
   a process model generation unit that uses the deviations from the time slice mean values for the time slices of data and the result variable data to develop a process model that predicts values of the result variable based on deviations from means of process parameters,
   wherein the process model generation unit stores the process state means as part of the generated process model, and
   wherein the process model generation unit is configured to adapt a computing device of the process control network of the process plant with the process model to predict a result variable of the online process.

13. The process model development system of claim 12, wherein the time slice mean calculation unit calculates a time slice mean for a particular process parameter of a particular time slice of data by determining an interpolation factor for the particular time slice of data using the value of the state variable for the particular time slice of data and stored state variable means for process states between which the value of the state variable for the particular time slice of data falls and by calculating the time slice mean for the particular process parameter for the particular time slice of data using the interpolation factor and the values of a set of process parameter means for the process states between which the value of the state variable for the time slice of data falls.

14. A process monitoring system for use in monitoring the operation of a online process operating within a process control network of a process plant, the system comprising:
   a data collection unit that stores, in the computer-readable memory, a process parameter value for each of a plurality of process parameters determined from the process during operation of the online process and a state variable value for a state variable determined from the online process during operation of the online process for each of a number of different process operational times of the on-line process of the process control network of the process plant;
   a time slice determination unit that determines a series of time slices of data from the data stored by the data collection unit, wherein each time slice of data includes a process parameter value for each of the plurality of process parameters and a state variable value for the state variable;
   a time slice mean calculation unit that calculates a time slice mean value for each of the process parameters for each of the time slices of data;
   a deviation calculation unit that calculates a deviation from the time slice mean value for each of the process parameters for each of the time slices of data, wherein the deviation calculation unit calculates a deviation from the time slice mean for a particular process parameter for a particular time slice of data by calculating a difference between the particular process parameter value of the particular time slice of data and the time slice mean of the particular process parameter of the particular time slice of data;
   a processor adapted with a process model stored on a computer readable memory coupled to the processor, the processor configured to execute the process model to predict values of a result variable based on the deviations from the time slice means of the set of process parameters associated with the online process of the process control network of the process plant; and a notification unit that notifies a user associated with the process control network of the predicted values of the result variable.

15. The process monitoring system of claim 14, further including an alarm unit that generates a user notification when the predication value indicates a process fault or a process quality problem.

16. The process monitoring system of claim 15, wherein the alarm unit compares the prediction value of the result variable to a threshold value to determine whether to generate the notification.

17. The process monitoring system of claim 14, further including a filter unit disposed between the deviation calculation unit and the statistical process model to filter the deviations from the time slice mean values produced by the deviation calculation unit for one or more of the process parameters for each of the time slices of data.

18. The process monitoring system of claim 17, wherein the filter unit performs filtering using a filter time coefficient and wherein the filter time coefficient is stored as part of the statistical process model as a filter time coefficient used to create the statistical process model.

19. The process monitoring system of claim 14, wherein the time slice mean calculation unit calculates a time slice mean for a particular process parameter of a particular time slice of data by determining an interpolation factor for the particular time slice of data using the value of the state variable for the particular time slice of data and stored state variable means for process states between which the value of the state variable for the particular time slice of data falls and by calculating the time slice mean for the particular process parameter for the particular time slice of data using the interpolation factor and the values of a set of process parameter means for the particular process parameter for the process states between which the value of the state variable for the time slice of data falls.

20. The process monitoring system of claim 19, wherein the statistical process model stores the state variable means and the set of process parameter means as a set of process state means used to generate the statistical process model.

21. The process monitoring system of claim 19, wherein the time slice determination unit includes a delay unit that shifts one or more of the process parameter values or the state variable values in time by a time delay amount as part of determining the series of time slices of data from the data stored by the data collection unit, so that each time slice of data includes a process parameter value for one or more of the plurality of process parameters or a state variable value for the state variable that is shifted in time by the time delay amount and wherein the delay unit obtains the time delay amount from the statistical process model.

* * * * *